(12) United States Patent
Baikerikar et al.

(10) Patent No.: US 8,147,974 B2
(45) Date of Patent: Apr. 3, 2012

(54) PROTECTIVE COATING FOR WINDOW GLASS HAVING ENHANCED ADHESION TO GLASS BONDING ADHESIVES

(75) Inventors: Kiran Baikerikar, Midland, MI (US); Syed Z. Mahdi, Rochester Hills, MI (US); Ben W. Schaefer, Bay City, MI (US)

(73) Assignee: Dow Global Technologies LLC, Midland, MI (US)

( * ) Notice: Subject to any disclaimer, the term of this patent is extended or adjusted under 35 U.S.C. 154(b) by 472 days.

(21) Appl. No.: 12/338,752

(22) Filed: Dec. 18, 2008

(65) Prior Publication Data

US 2009/0162592 A1    Jun. 25, 2009

Related U.S. Application Data

(60) Provisional application No. 61/014,547, filed on Dec. 18, 2007.

(51) Int. Cl.
*B32B 17/06* (2006.01)
*B32B 9/04* (2006.01)
*C08J 3/28* (2006.01)
*C08L 33/10* (2006.01)

(52) U.S. Cl. ........ 428/429; 428/428; 428/446; 428/448; 522/91; 525/29; 525/901; 525/925

(58) Field of Classification Search .................... 522/91; 525/29, 301, 925; 428/428, 429
See application file for complete search history.

(56) References Cited

U.S. PATENT DOCUMENTS

| | | |
|---|---|---|
| 3,152,162 A | 10/1964 | Fischer et al. |
| 3,549,396 A | 12/1970 | Dietz |
| 3,743,626 A | 7/1973 | Emmons |
| 3,971,751 A | 7/1976 | Isayama et al. |
| 4,218,513 A | 8/1980 | Williams et al. |
| 4,232,088 A | 11/1980 | Humphrey, Jr. et al. |
| 4,302,503 A | 11/1981 | Mattimoe |
| 4,345,053 A | 8/1982 | Rizk et al. |
| 4,368,236 A | 1/1983 | Frye |
| 4,374,210 A | 2/1983 | Ewen et al. |

(Continued)

FOREIGN PATENT DOCUMENTS

EP          414375 A    2/1993

(Continued)

OTHER PUBLICATIONS

Patent Abstracts of Japan, publication No. 06316444, Nov. 15, 1994, Central Glass Co. Ltd., Haruki Kuramasu, Heat Ray Reflecting and Ultraviolet-Absorbing Transparent Body.

(Continued)

*Primary Examiner* — Gwendolyn Blackwell
(74) *Attorney, Agent, or Firm* — Dobrusin & Thennisch PC

(57) ABSTRACT

A composition comprising: a)one or more film forming resins having at least one functional group capable of polymerization; b) one or more adhesion promoters comprising compounds containing one or more unsaturated groups capable of free radical polymerization and one or more trialkoxy silane groups; c) one or more fillers capable of imparting abrasion resistance to the composition; d) one or more compounds which is reactive with the film forming resin which also contains an acidic moiety; and e) one or more compounds comprising a siloxane backbone and one or more active hydrogen groups capable of reacting with the functional groups on a glass bonding adhesive: one or more second adhesion promoters comprising one or more silicon, titanium, zirconium, aluminum, or metal containing compounds; organic materials having reactive groups reactive with reactive groups on the surface of substrates or adhesives; or mixtures thereof.

16 Claims, 2 Drawing Sheets

U.S. PATENT DOCUMENTS

| | | |
|---|---|---|
| 4,374,237 A | 2/1983 | Berger et al. |
| 4,385,133 A | 5/1983 | Alberino et al. |
| 4,394,491 A | 7/1983 | Hoffman |
| 4,496,611 A | 1/1985 | Kawakubo |
| 4,522,975 A | 6/1985 | O'Conner et al. |
| 4,584,245 A | 4/1986 | Kuga et al. |
| 4,610,115 A | 9/1986 | Thompson, Jr. |
| 4,618,656 A | 10/1986 | Kawakubo et al. |
| 4,622,369 A | 11/1986 | Chang et al. |
| 4,625,012 A | 11/1986 | Rizk et al. |
| 4,643,794 A | 2/1987 | Saracsan |
| 4,645,816 A | 2/1987 | Pohl et al. |
| 4,672,100 A | 6/1987 | Schoenbachler |
| 4,687,533 A | 8/1987 | Rizk et al. |
| 4,697,026 A | 9/1987 | Lee |
| 4,735,830 A | 4/1988 | Oezelli et al. |
| 4,777,191 A | 10/1988 | Komai et al. |
| 4,780,520 A | 10/1988 | Rizk et al. |
| 4,788,254 A | 11/1988 | Kawakubo et al. |
| 4,792,316 A | 12/1988 | Skedeleski et al. |
| 4,822,680 A | 4/1989 | Catalano et al. |
| 4,835,012 A | 5/1989 | Saur |
| 4,837,274 A | 6/1989 | Kawakubo et al. |
| 4,839,122 A | 6/1989 | Weaver |
| 4,874,805 A | 10/1989 | Mulhaupt et al. |
| 4,906,707 A | 3/1990 | Yukimoto et al. |
| 4,910,279 A | 3/1990 | Gillis et al. |
| 4,923,927 A | 5/1990 | Hirose et al. |
| 4,950,581 A | 8/1990 | Koike et al. |
| 4,970,244 A | 11/1990 | Komai et al. |
| 5,010,202 A | 4/1991 | Greco |
| 5,011,900 A | 4/1991 | Yukimoto et al. |
| 5,061,567 A | 10/1991 | Brochot et al. |
| 5,063,269 A | 11/1991 | Hung |
| 5,063,270 A | 11/1991 | Yukimoto et al. |
| 5,114,989 A | 5/1992 | Elwell et al. |
| 5,128,423 A | 7/1992 | Parrinello |
| 5,167,899 A | 12/1992 | Jezic |
| 5,223,597 A | 6/1993 | Iwakiri et al. |
| 5,296,295 A | 3/1994 | Perkins et al. |
| 5,342,914 A | 8/1994 | Iwakiri et al. |
| 5,372,889 A | 12/1994 | Harisiades et al. |
| 5,391,588 A | 2/1995 | Sakamoto et al. |
| 5,395,697 A | 3/1995 | Morrison |
| 5,409,955 A | 4/1995 | Bockow et al. |
| 5,409,995 A | 4/1995 | Iwahara et al. |
| 5,466,727 A | 11/1995 | Hsieh |
| 5,502,045 A | 3/1996 | Miettinen et al. |
| 5,502,145 A | 3/1996 | Szum |
| 5,541,266 A | 7/1996 | Hasegawa et al. |
| 5,567,530 A | 10/1996 | Drujon et al. |
| 5,567,833 A | 10/1996 | Iwahara et al. |
| 5,603,798 A | 2/1997 | Bhat |
| 5,623,044 A | 4/1997 | Chiao |
| 5,650,467 A | 7/1997 | Suzuki et al. |
| 5,664,041 A | 9/1997 | Szum |
| 5,672,652 A | 9/1997 | Bhat |
| 5,683,804 A | 11/1997 | Nagashima et al. |
| 5,786,096 A | 7/1998 | Yoneda et al. |
| 5,840,428 A | 11/1998 | Blizzard |
| 5,852,137 A | 12/1998 | Hsieh et al. |
| 5,895,721 A | 4/1999 | Naoumenko et al. |
| 5,922,809 A | 7/1999 | Bhat et al. |
| 5,948,927 A | 9/1999 | Gunther |
| 5,976,305 A | 11/1999 | Bhat et al. |
| 5,976,702 A | 11/1999 | Yoneda et al. |
| 5,977,202 A | 11/1999 | Chawla et al. |
| 6,008,305 A | 12/1999 | Wang |
| 6,048,579 A | 4/2000 | Wang et al. |
| 6,080,817 A | 6/2000 | Thieben et al. |
| 6,090,866 A | 7/2000 | Kranig et al. |
| 6,116,774 A | 9/2000 | Sasaki et al. |
| 6,133,398 A | 10/2000 | Bhat |
| 6,150,431 A | 11/2000 | Miller et al. |
| 6,153,662 A | 11/2000 | Miller et al. |
| 6,191,187 B1 | 2/2001 | Yamamura et al. |
| 6,228,433 B1 | 5/2001 | Witt |
| 6,306,924 B2 | 10/2001 | Szum |
| 6,348,118 B1 | 2/2002 | Johnson et al. |
| 6,355,127 B1 | 3/2002 | Mahdi et al. |
| 6,395,856 B1 | 5/2002 | Petty et al. |
| 6,438,306 B1 | 8/2002 | Bishop |
| 6,461,419 B1 | 10/2002 | Wu et al. |
| 6,512,033 B1 | 1/2003 | Wu et al. |
| 6,582,804 B2 | 6/2003 | Wu et al. |
| 6,582,999 B2 | 6/2003 | Henley et al. |
| 6,592,998 B2 | 7/2003 | Anderson et al. |
| 6,592,999 B1 | 7/2003 | Anderson et al. |
| 6,596,445 B1 | 7/2003 | Matsumoto et al. |
| 6,623,791 B2 | 9/2003 | Sadvary et al. |
| 6,641,923 B2 | 11/2003 | Sadvary et al. |
| 6,649,016 B2 | 11/2003 | Wu et al. |
| 6,719,422 B2 | 4/2004 | Wu et al. |
| 6,828,403 B2 | 12/2004 | Mahdi et al. |
| 6,852,804 B2 | 2/2005 | Kennedy et al. |
| 6,875,470 B2 | 4/2005 | Trabesinger et al. |
| 6,974,500 B2 | 12/2005 | Miyata et al. |
| 6,995,208 B2 | 2/2006 | Mehta et al. |
| 7,087,127 B2 | 8/2006 | Mahdi et al. |
| 2001/0041782 A1 | 11/2001 | Okuhira et al. |
| 2001/0053445 A1 | 12/2001 | Kang et al. |
| 2002/0086914 A1 | 7/2002 | Lee et al. |
| 2002/0100550 A1 | 8/2002 | Mahdi et al. |
| 2002/0151616 A1 | 10/2002 | Ozai et al. |
| 2002/0198279 A1 | 12/2002 | Ha |
| 2003/0040551 A1 | 2/2003 | Yamaguchi et al. |
| 2003/0084995 A1 | 5/2003 | Zhang |
| 2003/0100676 A1 | 5/2003 | Okuhira et al. |
| 2003/0105230 A1 | 6/2003 | Hellmann |
| 2003/0187089 A1 | 10/2003 | Hohenrieder et al. |
| 2004/0191521 A1 | 9/2004 | Weiss et al. |
| 2005/0065226 A1 | 3/2005 | Mirone et al. |
| 2005/0081995 A1 | 4/2005 | Beckley |
| 2005/0113484 A1 | 5/2005 | Kamen |
| 2005/0126683 A1 | 6/2005 | Hsieh |
| 2005/0154076 A1 | 7/2005 | Bach |
| 2006/0025496 A1 | 2/2006 | Grandhee et al. |
| 2006/0191625 A1 | 8/2006 | Kapp et al. |
| 2006/0198963 A1 | 9/2006 | Chernyshov et al. |
| 2006/0287408 A1 | 12/2006 | Baikerikar et al. |
| 2007/0002328 A1 | 1/2007 | Woods et al. |
| 2007/0078337 A1 | 4/2007 | Vockler et al. |
| 2008/0075870 A1 | 3/2008 | Ambrose et al. |
| 2008/0085415 A1 | 4/2008 | Li et al. |
| 2008/0268259 A1 | 10/2008 | Schmatloch |
| 2008/0269452 A1 | 10/2008 | Schwoeppe |
| 2008/0274321 A1 | 11/2008 | Lefaux et al. |

FOREIGN PATENT DOCUMENTS

| | | |
|---|---|---|
| EP | 592138 A | 4/1994 |
| EP | 0666290 | 2/1995 |
| EP | 0666290 | 9/1995 |
| EP | 0687713 | 12/1995 |
| EP | 0687713 | 10/1997 |
| EP | 1231241 | 8/2002 |
| EP | 1153090 | 9/2002 |
| EP | 138625 A | 1/2004 |
| GB | 2147244 | 5/1985 |
| JP | 10036481 A | 2/1998 |
| JP | 2002012635 A | 1/2002 |
| JP | 2002309163 A | 10/2002 |
| JP | 2002309182 A | 10/2002 |
| JP | 2003128988 A | 5/2003 |
| JP | 2003226731 A | 8/2003 |
| JP | 2003336008 A | 11/2003 |
| JP | 2004168957 A | 6/2004 |
| JP | 2007063551 A | 3/2007 |
| WO | WO 98/51746 | 11/1998 |
| WO | 0000530 A1 | 1/2000 |
| WO | 0006512 A1 | 2/2000 |
| WO | 0147644 A1 | 7/2001 |
| WO | 03011583 A1 | 2/2003 |
| WO | 03011986 A1 | 2/2003 |
| WO | 03011992 A2 | 2/2003 |
| WO | 2006042305 A1 | 4/2006 |
| WO | 2007002328 | 1/2007 |
| WO | 2008036721 | 3/2008 |

OTHER PUBLICATIONS

Patent Abstracts of Japan, Publication No. 01192540, Aug. 2, 1989, Toyodo Gosei Co., Ltd., Fujio Hayakawa, Transparent Window Panel for Car.

WO2001044381A1, Method for Producing Radiation-Hardenable Coating Formulations and Use Thereof for the Production of Scratch-Resistant, Abrasionproof and Adhesive Coatings, Abstract, Rummel Siegbert et al.

EP1153090B1, Method for Producing Radiation-Hardenable Coating Formulations and Use Thereof for the Production of Scratch-Resistant, Abrasionproof and Adhesive Coatings, Abstract, Rummel Siegbert et al.

EP595165A2, Colorant for Dyeing of Plastics, Abstract, Runde, Hans, et al.

DE3241516A1, Multilayer system for thermal insulation application, Abstract, Brill, Klaus Dr., et al.

WO2001044381A1, Method for Producing Radiation-Hardenable Coating Formulations and use Thereof for the Production of Scratch-Resistant, Abrasionproof and Adhesive Coatings, Inst. Oberflaechen Modifizierun, Siegbert, Rummel et al., Abstract.

PROTECTIVE COATING FOR WINDOW GLASS HAVING ENHANCED ADHESION TO GLASS BONDING ADHESIVES

CLAIM OF BENEFIT OF FILING DATE

The present application claims the benefit of the filing date of U.S. Application Ser. No. 61/014,547, filed Dec. 18, 2007, which is hereby incorporated by reference for al purposes.

FIELD OF INVENTION

This invention relates to a coating for glass, plastic or plastic coated with an abrasion resistant coating wherein the coating has enhanced adhesion to adhesives used to bond glass into structures. The invented coatings are preferably pigmented and under preferred conditions prevent transmission of 99 percent or more of light through the coating. Furthermore, the invention relates to a method for applying the coating to glass or coated plastic and a method for bonding such a coated glass or plastic window into a structure, for instance, an automobile or building. In another embodiment, the invention is a system useful for bonding glass or coated plastic to a structure comprising a coating of the invention and an adhesive which bonds to the coating of the invention when disposed on glass or coated plastic and which also bonds to the surface of the structure. In a preferred embodiment, the glass or coated plastic can be bonded into a structure without the need for applying a primer to the window prior to the bonding operation.

BACKGROUND OF INVENTION

Bonding a window into a structure often requires cleaning the window surface where the adhesive is to be applied to remove contaminants, applying a primer to the area of the window to which the adhesive is to be applied, and then applying adhesive generally to the periphery of the window. Thereafter, the window with the adhesive applied thereto is placed into a window frame of the structure with the adhesive disposed between the window frame and the window and the adhesive is cured to hold the window in place. In many embodiments, the window has deposited on its surface, about the periphery, a coating often referred to as an enamel or frit. This coating is typically a black border which is used to prevent degradation of the adhesive by exposure to ultraviolet radiation and is a means of hiding the underlying color trim and adhesives. The enamels are typically ceramic based and require firing temperatures of about 500° C. to 700° C. to cure. In order for the adhesives to bond to such an enamel, a primer is required. The primer is applied to the surface of the ceramic enamel located on the surface of the window. Generally, the ceramic enamel is applied to the glass prior to shaping of the glass. For many windshield applications, the glass needs to be curved. In most operations, the glass is bent to shape after application and firing of the ceramic enamel.

The problem with the present process is that a primer is required to achieve a good durable bond between the adhesive and the enamel located on the glass. Further, the high temperatures necessary to process these ceramic enamels are undesirable. Additionally, an inorganic ceramic coating fused into the glass makes it difficult to recycle the glass, when there is a defect in the glass, which occurs during manufacture of the glass or at the end of life of a vehicle.

One solution to this problem is disclosed in commonly assigned United States Patent Publication number 2006-0287408 to Baikerikar and Mahdi. This reference discloses a composition comprising a) one or more film forming resins having at least one functional group capable of polymerizing; b) one or more reactive diluents capable of reacting with the film forming resin; c) one or more silicon, titanium, zirconium, aluminum, or metal containing compounds capable of promoting adhesion of the composition to glass; d) one or more fillers capable of imparting abrasion resistance to the composition when cured; and e) one or more compounds which is reactive with the film forming resin which also contains an acidic moiety. The coatings prepared from this composition demonstrate excellent abrasion resistance. However, the wet adhesion of these coatings to glass bonding adhesives can be further improved.

What is needed is a coating for glass which can be applied without the need for very, high curing temperatures, which can form a durable bond to glass substrates and to standard adhesives used for bonding glass to structures without the need for pre-application of primers, and which facilitates recycling of the glass.

SUMMARY OF INVENTION

In one embodiment, the invention is a composition comprising:
a) one or more film forming resins having at least one functional group capable of polymerization;
b) one or more adhesion promoters comprising compounds containing one or more unsaturated groups capable of free radical polymerization and one or more trialkoxy silane groups;
c) one or more fillers capable of imparting abrasion resistance to the composition when cured;
d) one or more compounds which is reactive with the film forming resin which also contains an acidic moiety; and
e) one or more compounds comprising a siloxane backbone and one or more active hydrogen groups capable of reacting with the functional groups on a glass bonding adhesive, one or more second adhesion promoters comprising one or more silicon, titanium, zirconium, aluminum, or metal containing compounds, organic materials having reactive groups which are reactive with reactive groups on the surface of substrates or adhesives to which the composition of the invention will be bonded, or a mixture thereof.

In a preferred embodiment, the composition further comprises f) one or more reactive diluents capable of reacting with the film forming resin. In a preferred embodiment, the composition further comprises a: g) thermoplastic wax. In a preferred embodiment, the composition further comprises: h) one or more pigments capable of blocking the transmission of ultraviolet light or dyes capable of imparting color to the coating. In another preferred embodiment, the functional groups capable of polymerizing the film-forming resin, polymerize when exposed to irradiation or a source of free radicals or cations. In another preferred embodiment, the composition further comprises: i) one or more catalysts or initiators capable of initiating polymerization of the film-forming resin when exposed to irradiation or which initiates cationic polymerization. In a more preferred embodiment, the film-forming resin contains unsaturated moieties which polymerize when exposed to free radicals. Preferably, e) comprises both of one or more compounds comprising a siloxane backbone and one or more active hydrogen groups capable of reacting with the functional groups on a glass bonding adhesive and one or more second adhesion promoters, such as one or more silicon, titanium, zirconium, aluminum, or metal containing compounds, organic materials having reactive groups which are reactive with reactive groups on the surface of substrates or adhesives to which the composition of the invention will be bonded. In another preferred embodiment, the second adhesion promoter comprises one or more compounds containing one or more melamine.

In another embodiment, the invention is glass, or plastic having an abrasion resistant coating deposited thereon, having a cured coating as described hereinbefore, disposed on a portion of one or more surfaces of the glass or coated plastic wherein the coating exhibits a light transmission of about 1 percent or less and an universal hardness of about 100 N/mm² or greater, more preferably 200 N/mm² or greater. In another embodiment, the invention is a coating comprised of a cured composition as described hereinbefore. In yet another embodiment, the invention is a window structure comprising a window frame and a window which comprises either glass or plastic coated with an abrasion resistant coating, which has a cured coating as described hereinbefore disposed on a surface of the glass or coated plastic. In another embodiment, the cured coating is bonded to an adhesive and the adhesive is further bonded to a window frame of the structure.

The invention also comprises a system for bonding glass or coated plastic to a structure wherein the system comprises a coating composition of this invention and an adhesive known to the skilled artisan for bonding glass into structures and which bonds to the coating composition of the invention. Preferably, the adhesive contains functional groups of isocyanate, silicon with hydrolyzable groups attached thereto or mixtures thereof.

In another embodiment, the invention comprises a method for coating glass, plastic or abrasion resistant coated plastic comprising applying a coating according to the invention to (a) glass or abrasion resistant coated plastic window and (b) exposing the coated window to conditions such that the coating cures. In a preferred embodiment, the glass is bent such that the surface upon which the coating is to be applied is curved. In one embodiment, the coating is pigmented and is applied to the periphery of one surface of the window. In yet another embodiment, the invention is a method for bonding a window into a structure which comprises a) applying an adhesive to the surface of the coating comprising the cured composition of this invention disposed on the periphery of the window; (b) contacting the window with a window frame of a structure wherein the adhesive is located between the window and the window frame and (c) allowing the adhesive to cure.

The coating of the invention and the processes described related to the coating of the invention offers significant advantages over those of the prior art. In particular, the coating of the invention can be applied to curved surfaces which allow application after shaping of the substrate such as a window. Since this coating is not fused into the glass at high temperatures, the coating allows recycling of the glass or plastic coated with an abrasion resistant coating either at the end of the life of the structure in which it is used or when there is a defect in the glass or plastic substrate. Known adhesives for bonding to glass materials are capable of bonding in a primerless manner to the cured coatings of the invention. The adhesive bond to the coatings of the invention is durable under extreme conditions, and is expected to last for a significant portion of, if not the entire life of, the structure to which the glass or plastic is bonded. Furthermore, the coating is abrasion resistant and provides good opacity, that is, low UV light transmission, preferably less than about 1 percent.

The cured coating of this invention demonstrates enhanced adhesion to known glass bonding adhesives.

FIGURES

DETAILED DESCRIPTION OF INVENTION

Figure 1:
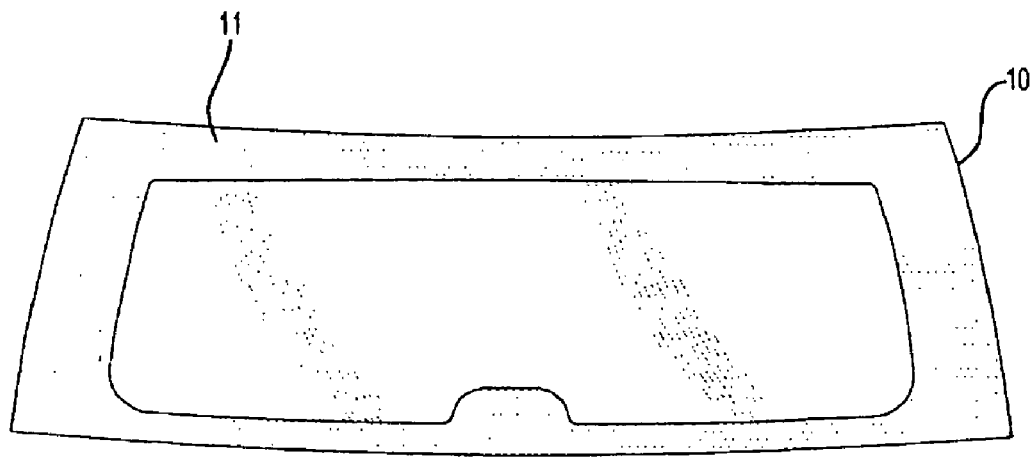
FIG. 1 illustrates window glass with a coating located on the window.

In one aspect, the invention is a coating composition useful for coating glass and plastic which has previously been coated with an abrasion resistant coating. Alternatively, the coating composition can be used to coat a plastic substrate and render the coated surface abrasion resistant. One component of the composition is a film-forming resin capable of forming a continuous matrix which can be cured by common curing techniques. A film-forming resin can be any resin which forms a continuous film and which cures under reasonable conditions. The film-forming resin contains one or more moieties which, under reasonable conditions, are able to polymerize and therefore form a continuous matrix and which is resistant to many environmental forces. In a preferred embodiment, the film-forming resin polymerizes when exposed to free radicals or to cationic reaction conditions. In a preferred embodiment, the film-forming resin cures by exposure to irradiation, such as UV radiation or an electron beam. Preferably the film-forming resin contains functional groups which polymerize when exposed to free radicals, such as vinyl, acrylate, styrenic, diene, methacrylate, allyl, thiolene, vinyl ether, unsaturated ester, imide, N-vinyl, acrylamide containing moieties and mixtures thereof and the like. In a more preferred embodiment, the functional groups on the film-forming resin are acrylate and/or methacrylate moieties. In many embodiments, the film-forming resin is an oligomer or prepolymer having the described functional moieties. Among preferred types of oligomers and prepolymers are those disclosed in Baikerikar US Patent Publication 2006/0287408 in paragraph (0022) incorporated herein by reference, hydroxyl-functional urethane acrylates, allophanate urethane acrylates and phenoxy urethane acrylates. A more preferred class of oligomers and prepolymers are the aliphatic urethane acrylates. Examples of aliphatic urethane acrylate oligomers or prepolymers which are commercially available include those disclosed in Baikerikar U.S. Patent Publication 2006/0287408 in paragraph (0022) incorporated herein by reference, the LAROMER™ series of aliphatic urethane acrylates from BASF such as LAROMER 8987 or the DESMOLUX series of urethane acrylates from Bayer, such as DESMOLUX™ XP 2666.

Another group of preferred film forming resins comprise acrylate functional oligomers having hydroxyl groups on the oligomers. Such oligomers can be dendritic in nature. More preferred classes of such oligomers are urethane acrylate and epoxy acrylate oligomers which contain hydroxyl groups. Preferably, such oligomers exhibit a number average molecular weight of about 500 of greater. Preferably, such oligomers exhibit a number average molecular weight of about 2,000 or less. Such oligomers contain a sufficient amount of hydroxyl groups to enhance adhesion of the coating to isocyanate functional adhesives. Preferably, the hydroxyl number is about 50 or greater and more preferably about 90 or greater. Preferably, the hydroxyl number is about 1000 or less, more preferably about 500 or less and most preferably about 200 or less. Among commercial acrylate functional oligomers containing hydroxyl groups are EBECRYL™ 8210 hydroxyl containing urethane acrylate available from Cytec, UA™ 00-022 urethane acrylate available from Rahn, BRP™-6021T50 phenoxy urethane acrylate from Bomar, CN™ UVE 151 epoxy acrylate having secondary hydroxyl groups available from Sartomer and BDE™ 1025 or BDE™ 1029 dendritic polyester acrylate with hydroxyl groups from Bomar or CN™ 2300 series of hyperbranched polyester acrylates with hydroxyl groups from Sartomer, SILMER™ ACR D2 acrylated siloxane oligomer with hydroxyl groups from Siltech, or RAD-ACTIVE IC™ acrylated polyester resin with hydroxyl groups from Kromachem.

To form an appropriate film, molecular weight is an important attribute. The lower molecular weight of the film-forming resin is preferably selected such that the film-forming resin, when coated on a substrate, forms a continuous matrix which retains the nature of a film and is a continuous matrix upon cure. The upper limit on molecular weight is the highest molecular weight at which the film forming resin is capable of being processed under reasonable conditions. Dendrimers having higher molecular weights may be used wherein the resulting composition can be processed using equipment typically used by those skilled in the art. The film-forming resin is present in the composition in a sufficient amount to form a continuous matrix when applied to a substrate and cured. In a preferred embodiment, the film-forming resin is present in an amount of about 10 parts by weight or greater based on the weight of the composition, and more preferably about 15 parts by weight or greater and most preferably about 20 parts by weight or greater. Preferably, the film-forming resin is present in the composition, based on the weight of the composition, in an amount of about 70 parts by weight or less, more preferably about 60 parts by weight or less, more preferably about 50 parts by weight or less, even more preferably about 40 parts by weight or less and most preferably about 35 parts by weight or less. As used herein, all parts by weight are based on 100 parts by weight of the recited base material or composition. In a case of the coating composition, this means the weights are based on 100 parts by weight of the coating composition.

The composition may further comprise a reactive diluent in sufficient amounts such that the composition has the desired viscosity. Generally, the desired viscosity is such that the composition is capable of being processed and forms a good coating. Any compound which reacts with the film-forming resin under polymerization conditions and which has low viscosity may be used. The reactive diluent may be monofunctional in that it has one functional group which will react with the other active components of the system. Among preferred monofunctional reactive diluents are monofunctional compounds containing ethylenic unsaturation, even more preferably compounds containing acrylate or methacrylate groups. Among most preferred monofunctional acrylate monomers is isobornyl acrylate. In another embodiment, the reactive diluent can be any polyfunctional compound capable of reacting with the film-forming resin to introduce links between the polymer chains formed during curing of the film-forming resin. As used herein, polyfunctional means two or more functional groups on average and more preferably three or more functional groups. Preferably, the polyfunctional reactive diluent has a functionality of about 3 or less. As used herein, polyfunctional shall be applied in a nominal nature in that it relates to compounds which have a theoretical functionality of two or more as opposed to actual functionality. In particular, imperfections as a result of processing or formation of byproducts are ignored in determining whether a compound is polyfunctional according to this definition. In reality, many compounds which are theoretically polyfunctional have a lower functionality than theoretical due to the formation of byproducts and incomplete reactions. Preferably, the reactive diluent has unsaturated groups which polymerize when exposed to free radicals or groups which react via cationic reaction mechanisms. Examples of functional moieties which may be used in the reactive diluent include vinyl, acrylate, styrenic, diene, methacrylate, allyl, acrylamide, methacrylamide, cycloaliphatic epoxide, alpha epoxide, acrylonitrile, and methacrylonitrile containing groups, combinations thereof and the like. Preferred functional groups are those functional groups which polymerize when exposed to free radicals. Among preferred functional groups which polymerize when exposed to free radicals are vinyl, acrylate, styrenic, diene, methacrylate, and allyl containing groups, combinations thereof and the like. Representative examples of monofunctional reactive diluents useful include disclosed in Baikerikar US Patent Publication 2006/0287408 in paragraph (0024) incorporated herein by reference. In one preferred embodiment, the reactive diluent is a monofunctional acrylate. Among preferred monofunctional acrylates are 2-(2-oxy)ethyl acrylate, 2-phenoxy ethyl acrylate, hydroxylethyl acrylate, other long chain alkyl acrylates, isobornyl acrylate, cyclic trimethylol propane formal acrylate, 3,3,5-trimethylcyclohexyl (meth)acrylate, monofunctional aliphatic urethane acrylates, mixtures thereof and the like. In a more preferred embodiment, the reactive diluent is a polyacrylate. Examples of polyacrylate reactive diluents include ethylene glycol di(meth)acrylate, hexanediol di(meth)acrylate, triethylene glycol di(meth)acrylate, butylene glycol di(meth)acrylate, tetraethylene glycol di(meth)acrylate, dipropylene glycol di(meth)acrylate, trimethylolpropane tri(meth)acrylate, ethoxylated trimethylolpropane tri(meth)acrylate, glycerol tri(meth)acrylate, pentaerythritol tri(meth)acrylate, pentaerythritol tetra(meth)acrylate, tris(2-hydroxy-ethyl)isocyanurate triacrylate, ditrimethylolpropane tetra(meth)acrylate, and alkoxylated polyol derived di or polyacrylates, such as propoxylated neopentyl glycol diacrylate or propoxylated glycerol triacrylate, neopentyl glycol di(meth)acrylate, combinations of these, and the like. Preferred reactive diluents are diacrylates such as 1,6 hexanediol diacrylate, 1,9 nonanediol diacrylate, 1,4 butanediol acrylate, tricyclodecane dimethanol diacrylate, cyclohexane dimethanol diacrylate, cis/trans 1,3/1,4 cyclohexanedimethanol diacrylate, alkoxylated cyclohexane dimethanol diacrylates, tripropylene glycol diacrylate, 1,3 butylene glycol diacrylate and the like. More preferred reactive diluents include propoxylated neopentyl glycol diacrylate, propoxylated glyceryl triacrylate, tricyclodecane dimethanol diacrylate, cis/trans 1,3/1,4 cyclohexanedimethanol diacrylate, 1,3 butylene glycol diacrylate, and tripropylene glycol diacrylate.

The reactive diluent can be introduced into the composition by directly adding it to the composition. Alternatively, it can be added to the composition as a diluent or carrier for solid materials added to the composition, for example fillers, pigments or dyes. In a preferred embodiment, the solid materials are dispersed into a reactive diluent before being added to the composition of the invention.

The presence of preferred reactive diluents comprising an acrylate functionality and a second functionality having an active hydrogen atom (such as hydroxyl, amine, carboxyl or thiol), an isocyanate, an acetoxy, an acryloxy, an epoxy urea, amido, urethane, or an amine-containing group can increase the solvent resistance and hardness or adhesion of the coatings prepared from the composition of the invention. Any reactive diluent having acrylate groups and active hydrogen containing groups, glycidyl (epoxy), isocyanate, acetoacetate, amine, urea, urethane, amide, melamine, hexamethoxymethylmelamine, carboxylic acid, or alkoxysilane can provide such advantages. Among preferred acrylate reactive diluents are hydroxyethyl acrylate, hydroxypropyl acrylate, hydroxybutyl acrylate, acrylic acid, methacrylic acid, glycidyl methacrylate, 2-tertbutylaminoethyl acrylate, urethane monoacrylate, hydroxyl functional acrylamides, isocyanatoethyl (meth)acrylate, acetoacetoxyethyl methacrylate, ethylene urea ethyl methacrylate, 2-[[(butylamino)carbonyl]oxy] ethyl acrylate, 2-isopropenyl-2-oxazoline and 2-vinyl-2-oxazoline, 2-aziridinylethyl (meth)acrylate and (meth)acryloylaziridine, methacrylamide, N,N-dimethylacrylamide, and (meth)acryloxypropyl trimethoxysilane. In the embodiment where a reactive diluent is used as a carrier for dispersion of solid compounds prior to their inclusion in the composition of the invention, the reactive diluents used as carriers are preferably diacrylates with a molecular weight of less than about 400 and more preferably about 350 or less. Among preferred reactive diluents for use as carriers for the solid materials are tricyclodecanedimethanol diacrylate, 1,4 butanediol diacrylate, 1,3 butylene glycol diacrylate, 1,6 hexanediol diacrylate, cis/trans 1,3/1,4 cyclohexanedimethanol diacrylate, 1,4 cyclohexanedimethanol diacrylate, alkoxylated cyclohexane dimethanol diacrylate, dipropylene glycol diacrylate, tripropylene glycol diacrylate, diethylene glycol diacrylate, triethylene glycol diacrylate, tetraethylene glycol diacrylate, propoxylated neopentyl glycol diacrylate, and ethoxylated neopentyl glycol diacrylate. The use of such reactive diluents as carriers of the solid materials can improve the solvent resistance and the universal hardness of the coatings prepared from the compositions of the invention.

The reactive diluent is present in a composition in sufficient amounts to provide a tough film which is capable of resisting many common environmental attacks and a viscosity which is amenable to the desired coating application method. The reactive diluent is present in a sufficient amount to achieve the desired viscosity of the composition. Preferably, the reactive diluent is present in the composition in an amount of about 2 parts by weight or greater based on the weight of the composition, more preferably about 5 parts by weight or greater and most preferably about 10 parts by weight or greater. The reactive diluent is preferably present in the composition in an amount of about 30 parts by weight or less, more preferably about 25 parts by weight or less and most preferably about 20 parts by weight or less based on the weight of the composition.

In a preferred embodiment, a mixture of reactive diluents is used in the coatings of the invention. Most preferably, a blend of monofunctional, difunctional, and trifunctional diluents are used. The reactive diluent having a functionality of greater than 2 is present in that amount which improves the scratch resistance of the coating. Preferably, the reactive diluent with a functionality of greater than 2 is present in an amount of about 1 part by weight or greater, more preferably about 3 parts by weight or greater and most preferably about 4 parts by weight or greater. Preferably, the reactive diluent having a functionality greater than 2 is present in an amount of about 15 parts by weight or less and more preferably about 12 parts by weight or less and most preferably about 10 parts by weight or less.

The choice of a reactive diluent may have an impact on the working time and the shelf life of the uncured coating. Working time is the time from initial reaction of the functional groups until the surface of the liquid coating formulation skins over. Shelf life is how long a curable composition can be stored until the composition cures such that the composition can no longer be used for its intended purpose.

The composition further contains one or more adhesion promoter(s) which are capable of enhancing the bonding of the composition to glass, coated plastic and/or an isocyanate or siloxy functional adhesive. An adhesion promoter (coupling agent) is defined herein as a material having at least one group capable of reacting, binding and/or associating with a group on at least one surface of the substrates to be bonded together. In one non-limiting embodiment, an adhesion promoter can serve as a molecular bridge at the interface of at least two surfaces wherein the surfaces can be similar or dissimilar surfaces. Adhesion promoters, in another non-limiting embodiment, can be monomers, oligomers and/or polymers. The primary adhesion promoters used in the composition of this invention comprise compounds which contain an unsaturated group capable of polymerization and one or more di- or trialkoxy silane groups. Preferably, the compound further comprises a heteroatom containing group which does not have any active hydrogens. Preferably, the heteroatom containing group is a tertiary amine, a urea, a urethane or an amide and most preferably a tertiary amine. The trialkoxy silane groups are preferred over dialkoxy compounds. Compounds with more than three alkoxy groups bonded to silicon atoms are preferred. More preferably, the first adhesion promoter contains more than one di- or trialkoxy silane moieties and even more preferably more than one trialkoxy silane. Preferably, the first adhesion promoter comprises 2 or greater alkoxy silanes. Even more preferably, the first adhesion promoter has 3 or greater alkoxy silanes. Preferably, the first adhesion promoter has 20 or less alkoxy silanes and more preferably 15 or less alkoxy silanes, even more preferably 12 or less alkoxy silanes and more preferably 10 or less alkoxy silanes. In one embodiment the primary adhesion promoter is a compound with an unsaturated group and one or more di- or trialkoxy silane moieties such as those disclosed in Baikerikar US Patent Publication 2006/0287408 in paragraph (0027) incorporated herein by reference N-(n-butyl)-3-aminopropyltrimethoxysilane, N,N'-bis[(3-trimethoxysilyl)propyl]ethylenediamine, or N-(3-methacryloxy-2-hydroxypropyl)-3-aminopropyltriethoxysilane.

In one embodiment, the first adhesion promoter is an adduct of a compound having an unsaturated group which is capable of free radical polymerization as described before and a compound having one or more di- or trialkoxy silane groups and, one or more second reactive groups, that is, one or more groups that are reactive other than a di- or trialkoxy silane. The first adhesion promoter may be synthesized by any of a number of reactions. Thus, the adhesion promoter may be prepared by a reaction of a first compound including at least one unsaturated group (e.g., an acrylate) and a second compound including one or more alkoxy silane groups. By way of example, the adhesion promotion additive may be the reaction product of a first compound including one or more alkoxy silane groups and a group selected from at least one of a mercapto group, an amino group, an epoxy group, a hydroxyl group, a sulfoethyl group, an isocyanate group, a (meth)acrylate group, a vinyl group, a carboxylic acid group, or any combination thereof, with a second compound including a moiety selected from at least one of an isocyanate group, a hydroxyl group, a carboxyl group, a mercapto group, an acetoacetoxy group, and amino group, an epoxy group, (meth)acrylate group, vinyl group, acryloyl halide group or any combination thereof. By way of more specific examples, one or more of the following synthesis reactions may be suitably employed for preparing the adhesion promotion additive:

a. mercapto silane+isocyanate functional acrylate (e.g., so as to include a reaction between —SH and —NCO);
b. amino silane+isocyanate functional acrylate or methacrylate (e.g., so as to include a reaction between —NH or —NH$_2$ with —NCO);
c. isocyanate silane+hydroxyl functional acrylate or methacrylate (e.g., so as to include a reaction between —NCO and —OH);
d. epoxy silane+amine functional acrylate or methacrylate (e.g., so as to include a reaction between epoxy and amine);
e. epoxy silane+carboxylic acid functional acrylate or methacrylate (e.g., so as to include a reaction between epoxy and —COOH);
f. mercapto acid silane+isocyanate functional acrylate or methacrylate (e.g., so as to include a reaction between —NCO with either/both —SH or —COOH);
g. Michael addition of amino silane+carboxylic acid functional acrylate or methacrylate (e.g., so as to include a reaction between the amine and the terminal double bond of the acrylate; thus the product would contain both alkoxysilyl and —COOH functionality with a terminal acrylate in the same molecule);
h. amino silane+epoxy functional acrylate or methacrylate, such as glycidyl methacrylate (e.g., so as to include a reaction between epoxy and amine);
i. isocyanate silane+amine acrylate or methacrylate (e.g., so as to include a reaction between —NH or —NH$_2$ with —NCO);
j. sulfoethyl acrylate or methacrylate+isocyanato silane (e.g., so as to include a reaction between —SO$_2$OH+—NCO);
k. hydroxy silane+isocyanate functional acrylate or methacrylate (e.g., so as to include a reaction between —NCO and —OH);
l. mercapto silane+epoxy functional (meth)acrylate such as glycidyl methacrylate (e.g., so as to include a reaction between —SH with epoxy);
m. epoxy silane+hydroxyl functional (meth)acrylate (e.g., so as to include a reaction between epoxy and —OH);
n. hydroxy silane+epoxy functional (meth)acrylate (e.g., so as to include a reaction between —OH with epoxy);
o. isocyanato silane+acetoacetoxy functional (meth)acrylate (e.g. so as to include a reaction between —NCO and active methylene group of acetoacetoxy functionality);
p. amino silane+acetoacetoxy functional (meth)acrylate (e.g. so as to include a reaction between amine and carbonyl group of acetoacetoxy functionality);
q. meth(acrylate) silane+acetoacetoxy functional (meth)acrylate (e.g. so as to include a Michael reaction between unsaturation from silane with active methylene group of acetoacetoxy functionality);
r. amino silane+polyacrylates (e.g. so as to include a Michael reaction between amine and acrylate);
s. hydroxyl silane+carboxylic acid functional (meth)acrylate (e.g. so as to include a reaction between hydroxyl and carboxylic acid);
t. amino silane+acryloyl or methacryloyl chloride (e.g. so as to include a reaction between an amine and chlorine to form an amide);
u. amino silane+acrylic or methacrylic acid (e.g. so as to include a reaction between an amine and carboxylic acid to form an amide);
v. anhydride silane+hydroxyl acrylate (e.g. so as to include a reaction between anhydride and hydroxyl; or any combination of the foregoing.

In another preferred embodiment, the adhesion promoter is the Michael addition product of siloxane further containing one or more active hydrogen containing functional moieties with a compound having two or more unsaturated groups capable of free radical polymerization, such as acrylate groups. The reaction product preferably has four or greater siloxy groups and more preferably six or greater. The reaction product preferably contains no active hydrogen atoms. The reaction products also preferably have at least one unsaturated group capable of reacting in the presence of free radicals. Preferably, the unsaturated group containing reactant is an alkoxylated polyol derived di- or polyacrylate such as propoxylated neopentyl glycol diacrylate, propoxylated glyceryl triacrylate, or other diacrylates such as hexanediol diacrylate, tripropylene glycol diacrylate, dipropylene glycol diacrylate, cyclohexanedimethanol diacrylate, alkoxylated cyclohexanedimethanol diacrylates, nonanediol diacrylate, tricyclodecane dimethanol diacrylate, cis/trans 1,3/1,4 cyclohexanedimethanol diacrylate, butanediol diacrylate, butylene glycol diacrylate, ditrimethylolpropane tetraacrylate, and the like. Alternatively, the adhesion promoter is the reaction product of glycidyl (meth)acrylate with an aminosilane, in which case the product contains multiple functional groups, such as (meth)acrylate, alkoxysilane, and aminoalcohol functionality.

Certain preferred adducts enhance the adhesion of the cured coating to isocyanate functional adhesives. The preferred adducts are Michael Adducts prepared from polyfunctional monomers having two or more acrylate moieties and hydroxyl groups. Such adducts are preferably prepared from polyacrylates prepared from polyfunctional alcohols or polyfunctional polyalkylene oxide polyols. Preferably, such polyacrylates demonstrate an equivalent weight of about 75 or greater and most preferably 90 or greater. Preferably such polyacrylates demonstrate an equivalent weight of about 500 or less and most preferably 300 or less. Preferably such polyacrylates have acrylate functionality of about 2 to about 6. Examples of preferred polyacrylate monomers include trimethylolpropane triacrylate, ethoxylated trimethylolpropane triacrylate, propoxylated glyceryl triacrylate, tris(2-hydroxyethyl)-isocyanurate triacrylate, pentaerythritol triacrylate, pentaerythritol tetraacrylate, ditrimethylolpropane tetraacrylate, tricyclodecanedimethanol diacrylate, propoxylated neopentyl glycol diacrylate, cyclohexanedimethanol diacrylate, 1,3 butylene glycol diacrylate, hexanediol diacrylate, nonanediol diacrylate, dodecanediol diacrylate, cis/trans 1,3/1,4 cyclohexane-dimethanol diacrylate, alkoxylated cyclohexanedimethanol diacrylate, tripropylene glycol diacrylate, tetraethylene glycol diacrylate, dipropylene glycol diacrylate, triethylene glycol diacrylate, dipentaerythritol pentacrylate, dipentaerythritol hexaacrylate, ethoxylated pentaerythritol tetraacrylate, and mixtures thereof.

The Michael addition products are prepared by reacting the reactants at elevated temperatures of about 30° C. to about 60° C., preferably about 55° C. for a sufficient time such that all of the functional groups having active hydrogen atoms are reacted, for instance all secondary amines are converted to tertiary amines. Preferably, the reactants are reacted at elevated temperatures for greater than about 72 hours. The nature of the alkoxy groups on the Michael addition product impacts the speed of cure of the coating composition of the invention. Methoxy groups hydrolyze faster and thus the curing reaction goes faster when methoxy groups are found on the siloxy groups. When higher alkoxy groups are present the reaction is slower. The overall reaction speed, and thus working time can be adjusted by adjusting the relative amount of alkoxy groups on the adhesion promoters and the ratio of the methoxy groups to higher alkoxy groups.

Generally, the first adhesion promoters are present in a sufficient amount to achieve a durable bond of the coating to glass, plastic or coated plastic, and preferably to form a durable bond to the adhesive. If too little adhesion promoter is used, then poor adhesion will be exhibited by the coating to the glass, plastic, coated plastic and/or adhesive. If too much adhesion promoter is utilized, the coating composition may be unstable. In this context "unstable" means that the composition may cure before being exposed to the desired curing conditions. Adhesion promoters are preferably present in an amount of about 1 part by weight or greater based on the weight of the composition, more preferably about 6 parts by weight or greater, even more preferably about 8 parts by weight or greater and most preferably about 10 parts by weight or greater. Preferably, the adhesion promoter is present in an amount of about 30 parts by weight or less based on the weight of the composition and more preferably about 20 parts by weight or less.

In another embodiment, the adhesion promoter is a high molecular weight adduct having multiple alkoxysilane moieties. Preferably, the adduct has 3 or greater alkoxysilane moieties and more preferably 6 or greater. Preferably, the adduct has a number average molecular weight of about 500 Da or greater and more preferably 1,000 Da or greater. The adduct preferably contains no reactive hydrogen containing moieties. In a preferred embodiment, the adduct is the reaction product of an epoxy silane, such as gamma propyl trimethoxy epoxy silane or gamma propyl triethoxy epoxy silane, with one or more silanes having reactive hydrogen containing moieties wherein the reactants are reacted under conditions that an excess of epoxy equivalents is present as compared to active hydrogen containing moieties. Preferably, the equivalent ratio of epoxy moieties to active hydrogen containing moieties is about 1.1 or greater; and more preferably about 1.12. Preferably, the equivalent ratio of epoxy equivalents to active hydrogen containing moieties is about 1.14 or less. The preferred active hydrogen containing moieties are amine and mercapto, with amine being most preferred. The epoxy silane active hydrogen containing silane reaction product is thereafter reacted with the reaction product of an aliphatic di- or polyisocyanate, such as tetramethylene diisocyanate (TMDI), and an active hydrogen functional moiety containing silane, for instance, an aminosilane or mercaptosilane. The two reaction products are reacted in a sufficient ratio such that the resulting adduct contains no active hydrogen atoms or isocyanate groups. The resulting adduct is added to the coating compositions in a sufficient amount to enhance the long term adhesion of the coating composition to substrates and adhesive systems. Preferably, the high molecular weight alkoxysilane containing adduct is present in an amount of about 1 part by weight or greater and more preferably about 5 parts by weight or greater. The high molecular weight alkoxysilane containing adduct is preferably present in an amount of about 15 parts by weight or less and most preferably about 10 parts by weight or less. The high molecular weight alkoxysilane adduct is preferably added to the coating composition of the invention in admixture with a reactive diluent as described hereinbefore. In a preferred embodiment, the adhesion promoter comprises a mixture of the Michael addition product containing alkoxysilane groups and the high molecular weight alkoxysilane adducts, preferably the two types of adducts are used in a ratio of Michael addition product to high molecular weight alkoxysilane adduct of about 1:1 to about 15:1 and more preferably about 1:1 to about 5:1.

In another embodiment, the composition of the invention further comprises one or more secondary adhesion promoters. A secondary adhesion promoter is any material which enhances the adhesion of the coating to another surface. Preferably the secondary adhesion promoter promotes adhesion to glass bonding adhesives. Such materials include, but are not limited to, organometallics such as silanes, titanates zirconates, aluminates, metal containing compounds, zirconium aluminates, hydrolysates thereof or organic materials having reactive groups which are reactive with reactive groups on the surface of substrates or adhesives to which the composition of the invention will be bonded, and mixtures thereof. The organic secondary adhesion promoters preferably contain one or more functional groups of amine, acrylate, hydroxyl, carboxylic acid, phosphonic acid, thiol, silanol, silyl hydride, melamine, alkoxymethylmelamine, acetoacetoxy, amide, urethane, urea or epoxy, with hydroxyl, acid, amine, acrylate, melamine, or alkoxymethylmelamine most preferred. Preferably, the organometallic adhesion promoter contains titanium or silicon and most preferably contains siloxy (silicon and oxygen) linkages. Preferably, the silicon-containing adhesion promoter is a polysiloxane such as those disclosed in U.S. Pat. No. 5,502,045 at column 2, lines 8-20 and at column 3, lines 3-54, incorporated herein by reference; tetraorthosilicates as disclosed in U.S. Pat. No. 6,306,924 at column 2, lines 26-39 and column 3, lines 24-42, relevant parts incorporated herein by reference; and multifunctional silanes such as those disclosed in Mahdi et al., U.S. Pat. No. 6,355,127 at column 21, lines 44 to column 22, line 38, relevant parts incorporated herein by reference or adhesion promoters that are reaction products of these silanes and other intermediates. Preferred multifunctional silanes comprise compounds which have one or more silane functionalities and one or more of a different functional group including epoxy, amino, isocyanate, isocyanurate, mercapto, acrylate, methacrylate, hydroxyl, allyl groups and the like. In one embodiment preferred secondary adhesion promoters for adhesion to coated surfaces, such as those coated with a clear coat or a pigmented coating, include the amino alkoxy silanes, isocyanato alkoxy silanes, epoxyalkoxy silanes, mercaptoalkoxysilanes and isocyanurate functional alkoxy silanes for instance. Titanate, zirconate or zircoaluminate adhesion promoters useful in this invention include those described in Wu et al., U.S. Pat. No. 6,649,016, column 7, line 23 to column 8, line 53, relevant parts incorporated herein by reference. Non-limiting examples of titanium and zirconate adhesion promoters include those commercially available under the TYZOR name from DuPont and those disclosed in U.S. Patent Publication 2006/0287408 at paragraph [0027], incorporated herein by reference. Preferred zirconium adhesion promoters include zircon aluminates. The secondary adhesion promoters are present in a sufficient amount to achieve a durable bond of the coating to glass, plastic or coated plastic, and preferably to form a durable bond to glass bonding adhesives such as isocyanate functional adhesives and adhesives capable of silanol condensation (i.e. adhesives having siloxy groups). If too little adhesion promoter is used, then poor adhesion will be exhibited by the coating to the glass, plastic, coated plastic and/or adhesive. If too much adhesion promoter is utilized, the coating composition may be unstable. In this context "unstable" means that the composition may cure before being exposed to the desired curing conditions. The secondary adhesion promoters are preferably present in an amount of about 1 part by weight or greater based on the weight of the composition, more preferably about 6 parts by weight or greater and most preferably about 8 parts by weight or greater and preferably about 10 parts by weight or greater. Preferably, the adhesion promoter is present in an amount of about 30 parts by weight or less based on the weight of the composition and more preferably about 20 parts by weight or less.

Preferably, the organic adhesion promoter in the secondary adhesion promoter is an amine or a melamine. In one preferred embodiment, the secondary adhesion promoter comprises one or more compounds containing one or more melamine units. Melamines units have the structure of:

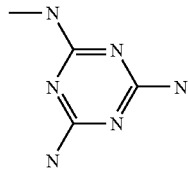

Any compound containing a melamine unit which enhances adhesion to one or more surfaces may be used. Preferably, the melamine unit containing compounds have substituents on the noncyclic amine nitrogens of the melamine. More preferably the noncyclic amine nitrogens are tertiary. Preferably, the substituents are hydrocarbyl and may contain one or more heteroatom containing functional groups. Preferably, the functional groups are ether, carboxylate or mixtures thereof. Preferred substituents are hydrocarbyl, hydrocarboxyhydrocarbylene (such as methoxymethyl and also referred to as methylol groups), and hydrocarbylcarboxylatehydrocarbyleneoxyhydrocarbylene. "Noncyclic amine nitrogen" means a nitrogen of an amine group which is not located in a cyclic ring. Hydrocarboxy-hydrocabylene" means a hydrocarbon group bonded to an oxygen and further bonded to a hydrocarbylene (R'—O—R"— wherein R' is hydrocarbyl and R" is hydrocarbylene). "Hydrocarbylcarboxylatehydrocarbyleneoxyhydrocarbylene" means a hydrocarbyl group bonded to a carboxylate which is further bonded to a hydrocarbylene further bonded to an oxygen which is further bonded to a hydrocarbylene (R'C(O)O—R"—O—R"—). Hydrocarbyl refers to units containing carbon and hydrogen atoms which are monovalent. Hydrocarbylene refers to units containing carbon and hydrogen atoms which units are divalent. In one preferred embodiment the hydrocarbyl group (R') contains an unsaturated group which polymerizes when exposed to free radicals. Preferred polymerizable groups include acrylate, methacrylate and vinyl groups. Preferably, the hydrocarbyl group (R') is $C_{1-4}$ alkyl, more preferably $C_{1-2}$ alkyl and most preferably methyl. Preferably, the hydrocarbylene group (R") is $C_{1-4}$ alkylene and more preferably $C_{1-2}$ alkylene. A more preferred hydrocarboxyhydrocarbylene group is methoxymethylene. A more preferred hydrocarbylcarboxylatehydrocarbyleneoxyhydrocarbylene is acrylate ethoxymethoxy ($CH_2$=$CHC(O)OCH_2CH_2OCH_2$—). In embodiments where one or more of the noncyclic amines on a melamine containing compound has an unsaturated group which is free radically polymerizable, the resulting cured coating of the invention containing such a compound exhibits higher hardness and enhanced scratch resistance. The melamine containing compounds can be melamine containing oligomers such as melamine formaldehyde condensates. Examples of preferred melamine resins useful as secondary adhesions promoters comprise include melamine-formaldehyde resins, such as hexamethoxymethyl melamine (i.e. methylated melamine-formaldehyde resin commercially available from Cytec as CYMEL™ 300 or CYMEL™ 303ULF); alkylated melamine-formaldehyde resins, such as methylated/n-butylated melamine-formaldehyde resin (CYMEL™ 1135 from Cytec); partially-methylated melamine-formaldehyde resin (such as CYMEL™ 370 from Cytec include: fully alkylated melamine-formaldehyde resins (CYMEL™ 300, 301, 303, 350, 1130, 1131, 1133, 1135, 1156, 1161, 1168 from Cytec); high imino melamine-formaldehyde resins (CYMEL™ 202, 323, 324, 325, 327, 385, 1158); and partially alkylated melamine-formaldehyde resins (CYMEL™ 370, 373, 380). Melamine-formaldehyde resins are also commercially available from BASF (such as LUWIPAL™ 044 or 066) or Nuplex Resins (such as SETAMINE™ 19-3087). Examples of melamine acrylate oligomers which are commercially available are the BM series from Bomar, such as BMA™ 200, BMA™ 215, BMA™ 220, BMA™ 222, BMA™ 250, BMA™ 300, or BMA™ (XMA) 224. In one preferred embodiment the secondary adhesion promoter is an epoxy silane or an epoxy silane in admixture with an organic adhesion promoter. Examples of such materials include Z-6106 epoxysilane-modified melamine (blend of glycidoxypropyltrimethoxysilane and hexamethoxymethylmelamine) from Dow Corning or blends of epoxysilanes with melamine acrylate oligomers, such as those commercially available from Bomar.

The composition further comprises a filler. The filler can be any filler which is capable of improving the abrasion resistance and surface hardness of the cured composition. Further, the filler must be capable of being dispersed in the coating composition. Preferred classes of fillers are silicates, aluminas, zirconias, carbides, oxides, nitrides or any other fillers with high hardness (Mohs Hardness of greater than about 7). Preferred classes of fillers include alumina (e.g., alpha alumina), silica, zirconia, boron carbide, silicon carbide, cerium oxide, glass, diamond, aluminum nitride, silicon nitride, yttrium oxide, titanium diboride, aluminosilicates (i.e. "Zeeospheres" from 3M), titanium carbide, combinations thereof, and the like. Preferred fillers are silicates and aluminas, with aluminas being more preferred. More preferred aluminas useful in the invention are alpha aluminas. Preferably, the fillers have a particle size of about 10 microns or less and most preferably 5 microns or less. The filler is present in a sufficient amount to enhance the surface hardness and abrasion resistance of the coating and in an amount such that a homogeneous dispersion can be prepared. Preferably, the filler is present in an amount of about 5 percent by weight or greater based on the weight of the composition, more preferably about 10 percent by weight or greater and most preferably about 20 percent by weight or greater. The filler is preferably present in an amount of about 60 parts by weight or less based on the weight of the composition, more preferably about 50 parts by weight or less and most preferably about 40 parts by weight or less. The filler is preferably dispersed in a reactive diluent, preferably with the aid of a dispersant, prior to addition of the filler to the composition of the invention.

The composition further comprises a compound which is reactive with the film-forming resin and which also contains an acidic moiety. In particular, the compound has a functional group or moiety which will react with the functional moieties contained in the film-forming resin. Preferably, such a reactive group undergoes reaction when exposed to free radicals, radiation or cations. Such moieties are described hereinbefore. The compound which is reactive with the film-forming resin and which contains an acidic moiety is present for the purpose of enhancing bonding of the composition to glass, plastic or coated plastic and to adhesive systems. Preferably, the acid group is a strong acid group; such strong acids include carboxylic acids, phosphoric acids, sulfuric acids and sulfonic acid groups. Preferred acid groups are carboxylic acid groups and phosphoric acid groups, such as phosphate acids. The most preferred acid groups are carboxylic acid groups. Preferably, the compound containing an acidic group is a compound which has an acid group and one or more functional groups which polymerize when exposed to free radicals, radiation or which react when contacted with cations. Preferable are compounds which polymerize when exposed to free radicals or radiation and included are acrylate, vinyl, allyl, vinyl ether or (meth)acrylate groups. Preferably, a nonfunctional alkyl chain connects the ethylenic unsaturated group to the strong acid group. Among preferred classes of acid-containing compounds are disclosed in U.S. Patent Publication 2006/0287408 at paragraph [0035], incorporated herein by reference. More preferred acids are 2-acrylamido-2-methylpropanesulfonic acid, methacrylic acids and acrylic acids, with methacrylic acids and acrylic acids being most preferred. The acid is present in a sufficient amount to enhance bonding to the glass or coated plastic and/or adhesive. If too much acid is used, the stability of the composition may be negatively impacted. The reactive acid-containing compound is present in the composition in an amount of about 1 part by weight or greater based on the composition and preferably about 2 parts by weight or greater. The reactive acid compound is preferably present in the composition in an amount of about 10 weight parts or less, more preferably about 8 weight parts or less and most preferably about 6 weight parts or less.

The composition of the invention further comprises one or more compounds comprising a siloxane backbone and one or more active hydrogen groups capable of reacting with an isocyanate group. Any compound having the recited components which improves the adhesion of the coating to adhesives containing isocyanate groups or silicon atoms having hydrolyzable group bonded thereto may be utilized in the composition of the invention. Preferably, the siloxane backbone is a polydimethyl siloxane backbone (—SiO(CH$_3$)$_2$—). Preferably, the functional groups on the siloxane backbone are silicon hydride (Si—H), hydroxyl, amino, carboxylic acid, phosphonic acid, mercapto, epoxy, isocyanate, anhydride, silanol, acrylate, or mixtures thereof. Preferably, the active hydrogen functional siloxane is of a sufficient molecular weight that it can migrate to the surface of the coating to facilitate bonding with functional groups of the glass bonding adhesive but not so large that it interferes with the interfacial adhesion of the coating to surfaces or adhesives. Preferably, the active hydrogen functional siloxane has an equivalent weight of about 250 or greater, more preferably about 350 or greater and most preferably about 450 or greater. Preferably, the active hydrogen functional siloxane has an equivalent weight of about 4000 or less, more preferably about 3500 or less and most preferably about 3,000 or less. Preferably, the active hydrogen functional siloxane has a sufficient amount of active hydrogen containing functional groups so as to enhance the adhesion of the coating to an isocyanate functional adhesive. More preferably, the active hydrogen functional siloxane has a hydroxyl number of about or 10 greater and most preferably about 20 or greater. More preferably, the active hydrogen functional siloxane has a hydroxyl number of about 500 or less and most preferably about 250 or less. To allow the composition of the invention to be applied to a substrate by screen printing, it is preferred that the active hydrogen containing siloxane further contain unsaturated groups which polymerize when exposed to free radicals. Preferred unsaturated groups are acrylate groups. Among preferred active hydrogen functional siloxanes are SIL-AMINE™ aminoethylaminopropyl silicone solubilized with polyether groups having a structure represented by the formula:

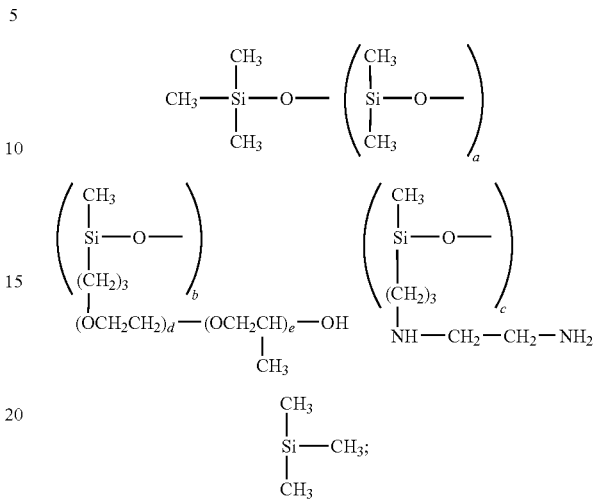

SILAMINE™ D10-D Hydrophobic tertiary silicone amine which is represented by the formula:

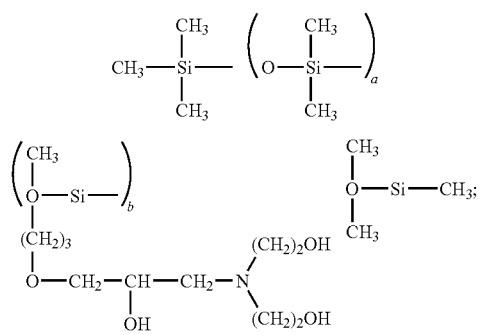

SILMER™ OH J10 hydroxyl functional silane which is represented by the formula:

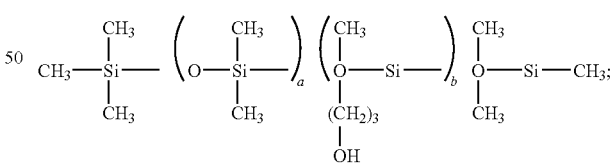

SILUBE™ CS-1 Succinic-based carboxylate silicone in free acid form and SILUBE™ CP-1 phthalic-based carboxylate in free acid form, which are represented by the formulas:

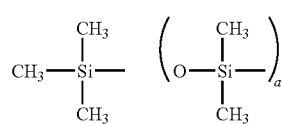

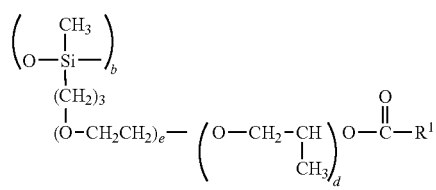

where R¹-alkyl group for Silwaxes

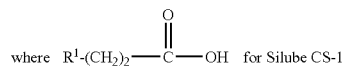

where R¹-(CH₂)₂—C(=O)—OH for Silube CS-1

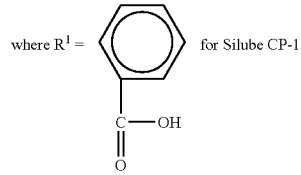

where R¹ = 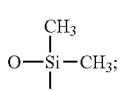 for Silube CP-1

SILMER™ H Di E2 Linear difunctional and multi-functional silicone hydride prepolymer which is represented by the formula:

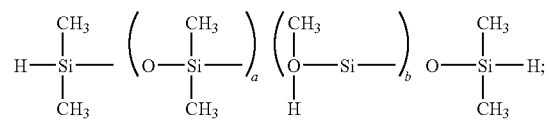

DC-2737™ Linear difunctional silanol terminated silicone pre-polymer which is represented by the formula HO—Si—O (Si—O)x-Si—OH;

SILMER™ NCO Di-10 Linear difunctional isocyanate terminated silicone pre-polymer which is represented by the formula:

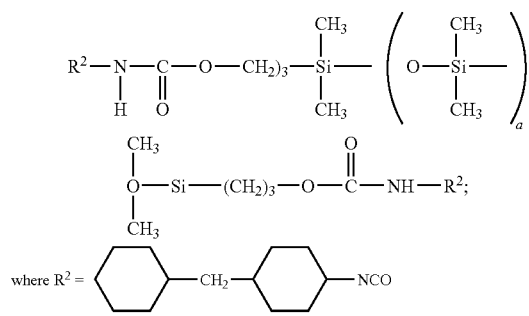

SILPHOS™ A-100 silicone polyether phosphate ester in free acid form (phosphonic acid) which is represented by the formula:

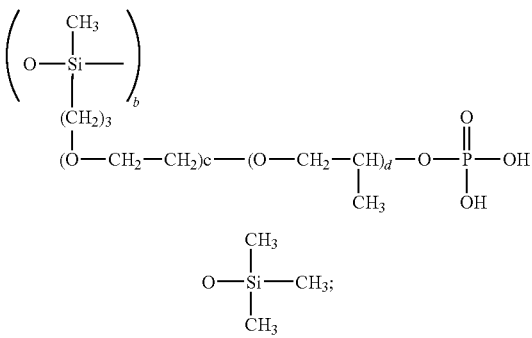

SILMER™ ACR Di-10 Linear difunctional acrylate terminated silicone pre-polymer which is represented by the formula:

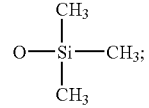

SILMER™ ACR D2 multifunctional acrylate terminated silicone pre-polymer, which is represented by the formula:

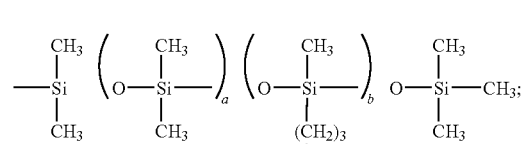

and where c and d=0, and R⁴ can include hydroxyl (—OH).

DMS-U22™ (3-acryloxy-2-hydroxypropyl) terminated polydimethylsiloxane, which is represented by the formula:

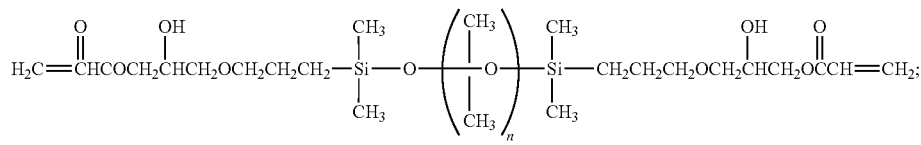

DMS-Z21 succinic anhydride terminated polydimethylsiloxane;

DMS-B12 or B25 or B31 (carboxyalkyl) terminated polydimethylsiloxane;

SMS-022 or 042 or 992 (mercaptopropyl)methylsiloxane-dimethylsiloxane copolymers;

DMS-A211 or DMS-A214 n-ethylaminoisobutyl terminated polydimethylsiloxane, which are represented by the formula:

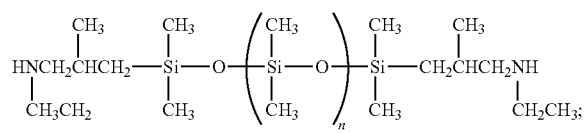

ATM-1112™ or 1322 aminoethylaminopropylmethoxy-siloxane)-dimethylsiloxane copolymer with branch structure, which is represented by the formula:

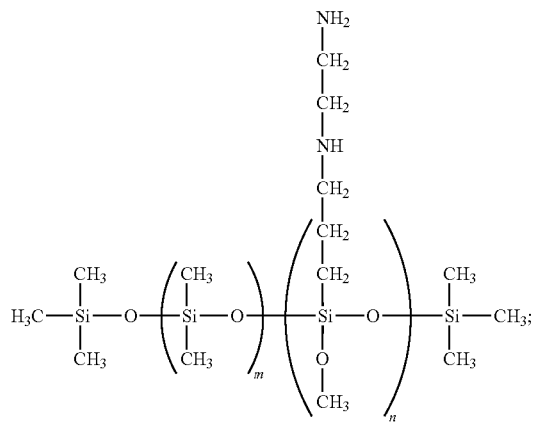

VMM™-010 vinylmethoxysilane homopolymer, which is represented by the formula:

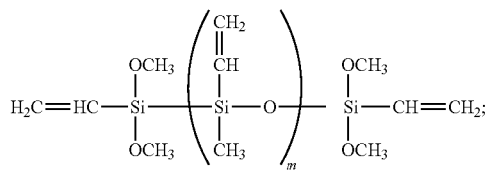

SILMER, SILAMINE, SILUBE, and SILPHOS are trademarks of Siltech Corporation. DC is a trademark of Dow Corning Corporation. ATM, DMS, and SMS are trademarks of Gelest Corporation. The active hydrogen functional siloxane is present in sufficient amount to enhance the adhesion of the coating to an adhesive. If too little is used, there is no impact on the adhesion and if too much is utilized, adhesion is negatively impacted. Preferably, the active hydrogen functional siloxane is present in the composition in an amount of about 0.05 parts by weight or greater, more preferably about 0.1 parts by weight or greater and most preferably about 0.2 parts by weight or greater. Preferably, the active hydrogen functional siloxane is present in the composition in an amount of about 10 parts by weight or less, more preferably about 6 parts by weight or less, even more preferably about 5 parts by weight or less, yet even more preferably about 4 parts by weight or less and most preferably about 2 parts by weight or less.

The composition of the invention may further comprise a thermoplastic wax. In addition, thermoplastic waxes can be used to further improve scratch resistance and the slip of the coating. The wax can be added to the coating formulation either as a powder or as a dispersion in acrylate monomer. Preferred thermoplastic waxes include those based on polyethylene, polytetrafluoroethylene or polypropylene wax dispersions in acrylate monomers, such as the EVERGLIDE™ or S-395 or SST series of products from Shamrock Technologies, or polyamide particles such as ORGASOL™ from Arkema, or montan wax with reactive acrylate groups, such as CERIDUST™ TP 5091 from Clariant, or CERAFLOUR™ wax powders from Byk-Chemie. Preferably, the wax is in powder form having a particle size which is smaller than the desired thickness of the coating prepared from the composition of the invention. Preferably, the maximum particle size is about 30 microns or less, more preferably about 25 microns or less, even more preferably about 20 microns or less and most preferably about 15 microns or less Preferably, the wax exhibits a melting point above the temperatures at which the compositions and coatings are processed. Preferably, the wax has a melting point above 100° C., preferably above 110° C. and most preferably above 120° C. Preferably, the wax is highly crystalline. In a preferred embodiment, the wax comprises a polyethylene, polypropylene, polyamide, polytetrafluoroethylene, or blends and/or copolymers thereof. More preferably, the wax is crystalline polyethylene or polytetrafluoroethylene or blends of polyethylene with polytetrafluoroethylene. Waxes which contain unsaturated groups which undergo free radical polymerization may also be utilized in this invention. The thermoplastic wax is preferably insoluble in the coating composition so that it retains its particle structure in the coating. The thermoplastic wax is preferably introduced as a dispersion in a reactive diluent carrier. The thermoplastic wax may be used in a sufficient amount to enhance scratch resistance or adhesion of the coating to glass bonding adhesives. Preferably, the wax is used in an amount of about 0.05 part by weight or greater based on the weight of the composition, more preferably about 1 parts by weight or greater and most preferably about 2.5 parts by weight or greater. Preferably, the wax is used in an amount of about 20 parts by weight or less based on the weight of the composition, more preferably about 15 parts by weight or less, even more preferably about 12 parts by weight or less and most preferably about 10 parts by weight or less.

The composition may further comprise pigments or dyes. The pigments or dyes may be present to provide a desired color or to provide opacity to the composition. Preferably, the pigments or dyes are durable, meaning that they have good outdoor durability and resist fading upon exposure to sun and the elements. Preferably, the pigments reduce light transmission through the coating. In a preferred embodiment, the pigments are capable of reducing light transmission through the coating to less than 1 percent of the light in contact with the coating. Furthermore, it is preferable that the pigments or dyes do not interfere in bonding of the coating to glass, plastic, coated plastic or an adhesive. Pigments or dyes useful in the invention may be organic or inorganic. Preferable inorganic pigments include those disclosed in Baikerikar US Patent Publication 2006/0287408 in paragraph (0036) incorporated herein by reference. A list of commercial pigments which are useful in the compositions of the invention are disclosed in U.S. Patent Application 2002/0086914, relevant portions incorporated herein by reference. Preferred pigments include carbon black or black iron oxides or black IR reflective pigments. In the embodiment where the composition is used to coat a window, it is preferable that the pigment utilized be a black pigment. Further, it is preferred that the pigment be carbon black. Any known carbon black may be utilized in the invention. Some grades of carbon black are conductive and others are treated to be non-conductive. The carbon black should be selected to match the environment in which the coating is utilized. For instance, some automotive applications require that the carbon black be non-conductive to prevent interference with other functionality placed on or near the windows of the vehicle. In other environments, it may be desirable for the coating to have conductivity and conductive carbon black may be selected. The pigments or dyes are used in an amount sufficient to give the desired functionality to the coating. In particular, if the pigment or dye is used simply for coating, then the sufficient amount of pigment or dye is used to get the desired color. Conversely, if the pigments are added to introduce opacity to the coating, then a sufficient amount of pigment is used to introduce the desired level of opacity. In a preferred embodiment, the pigment is black and utilized to introduce opacity to the coating. Preferably, the dyes are translucent. Preferably, the pigments or dyes are dispersed in the reactive diluent prior to incorporation into the coating. In another embodiment, it is desirable to incorporate into the coating infrared reflective pigments, such as chromium green or black hematite to reduce the heat which the coating is exposed to during processing. The pigment should be present in an amount such that the cured coating exhibits the desired light transmittance, preferably of less than 1 percent of the light is transmitted therethrough at the desired coating thickness. Preferably, the pigment or dye is present in an amount of about 0.5 part by weight or greater and most preferably about 1 part by weight or greater. Preferably, the amount of pigment useful is about 15 parts by weight or less and most preferably about 12 parts by weight or less.

The composition may further comprise a catalyst or initiator capable of initiating cure of the film-forming resin under curing conditions. Preferably, those curing conditions are sufficient to cause formation of free radicals or cations. Preferred catalysts or initiators include photoinitiators which initiate free radical polymerization by the formation of free radicals or which generate cations, or thermal initiators which generate free radicals or which form or release cations when exposed to heat. Photoinitiator systems having a corresponding sensitivity to actinic radiation are normally incorporated into formulations containing compounds of the present invention and upon irradiation lead to the formation of reactive species capable of initiating polymerization. In the preferred embodiment, the initiator is a compound which when exposed to irradiation initiates free radical polymerization. Examples of photoinitiators and preferable photoinitiators useful in the compositions of the invention are disclosed in U.S. Patent publication 2006-028704 paragraphs [0033], [0034] and [0036], incorporated herein by reference.

It is also possible to add thermal free radical initiators, for example, organic peroxide initiators such as benzoyl peroxide (other suitable peroxides are described in U.S. Pat. No. 4,950,581, column 19, lines 17-25), incorporated herein by reference or cationic initiators, such as aromatic sulfonium, phosphonium or iodonium salts, as described, for example, in U.S. Pat. No. 4,950,581, column 18, line 60 to column 19, line 10 incorporated herein by reference. An example of an iodonium salt is (4-isobutyl-phenyl)-4-methylphenyl-iodonium hexafluorophosphate. Maleimide derivatives, as described, for example, in U.S. Pat. No. 6,153,662 or U.S. Pat. No. 6,150,431 both incorporated herein by reference, may also be present. Examples which may be mentioned are N-(2-trifluoromethyl-phenyl)maleimide and N-(2-tert-butylphenyl)maleimide.

Among preferred classes of photoinitiators are alpha aminoketones, benzophenones, phosphine oxides, alpha hydroxyketones, mixtures thereof and the like. Among preferred photoinitiators are 1-hydroxycyclohexyl-phenylketone available from Ciba Geigy under the trademark and designation IRGACURE 184, alpha hydroxy ketones such as IRGACURE 2959 from Ciba, oligomeric alpha hydroxyketones, such as ESACURE ONE or KIP 150 from Lamberti, 2-benzyl 2-N-dimethylamino-1-(4-morpholinophenyl)-1-butanone available from Ciba under IRGACURE 369 or IRGACURE 379, and phosphine oxides available from BASF under LUCIRIN TPO, LUCIRIN TPO-L, LUCIRIN TPO-XL, or IRGACURE 819, IRGACURE 2100 from Ciba, mixtures thereof, such as SARCURE SR 1135 from Sartomer or ESCACURE KTO 46 or TZT from Lamberti, which is a mixture of an alpha hydroxy ketone benzophenone derivatives and a phosphine oxide, and the like. Preferably, the catalyst or initiator is present in a sufficient amount to catalyze polymerization when exposed to appropriate polymerization conditions as described hereinafter. Preferably, the catalyst or initiator is present in an amount of about 0.1 part by weight or greater based on the weight of the composition, more preferably about 1 part by weight or greater, even more preferably about 2 parts by weight or greater and most preferably about 4 parts by weight or greater. Preferably, the catalyst or initiator is present in an amount of about 20 parts by weight or less, more preferably about 15 parts by weight or less, even more preferably about 12 parts by weight or less and most preferably about 10 parts by weight or less based on the weight of the composition.

The coating compositions of the invention cure by two mechanisms. First, they cure as a result of free radical polymerization of the unsaturated moieties or cationic polymerization. Further, the coatings cure by silanol condensation. The silanol condensation proceeds upon exposure to atmospheric moisture. This is a relatively slow curing mechanism in the absence of a catalyst. Silanol condensation is catalyzed by acid, base or organic metallic catalysts, as described hereinafter with respect to the adhesive systems. The coating compositions of the invention contain acidic containing compounds and may contain amines which catalyze the reaction. Alternatively, a moisture cure catalyst as described hereinafter may be added.

The composition may further comprise a dispersant or surfactant which stabilizes the dispersion of solid particles in the liquid medium and facilitates formation of a continuous void-free film. Suitable dispersants are all surface-active compounds, preferably cationic, anionic and non-ionic surfactants, as well as polymeric dispersants which disperse components in the composition of the invention and which stabilize the compositions, that is, prevent the compositions from phase separating or components from precipitating from the compositions. Examples of dispersants which may be used according to the invention include phosphate acid esters, and those disclosed in U.S. Patent Publication 2006/0287408 at paragraph [0042], incorporated herein by reference. Another useful class of dispersants are polymeric dispersants and protective colloids, including amphiphilic copolymers, block copolymers or graft or comb polymers, especially those based on acrylic acid, methacrylic acid or salts thereof, hydroxyalkyl(meth) acrylic acid, aminoalkyl(meth)acrylic acid or salts thereof, 2-acrylamido-2-methylpropanesulfonic acid (AMPS) or salts thereof, maleic anhydride or salts thereof, (meth)acrylamide or substituted (meth)acrylamides, vinyl heterocycles, for example, vinylpyrrolidone, vinylimidazole, as well as amphiphilic polymers containing segments of (polyethylene oxide) PEO or EO/PO (ethylene oxide/propylene oxide) copolymers. Examples of suitable protective colloids are polyvinyl alcohol, polyvinylpyrrolidone or its copolymers. Also suitable are copolymers of synthetic monomers, especially of monomers having carboxyl groups, for example, copolymers of 2-vinylpyrrolidone with 3-vinylpropionic acid or maleic acid copolymers and salts thereof.

Most preferred dispersants and surfactants include polymeric amide hyperdispersants available from Noveon under the trademark SOLSPERSE 32000 and 39000 and polypropylene oxide based ammonium salts, such as diethylpolypropoxy methyl ammonium chloride available from Degussa under the trademark and designation VARIQUAT CC-59 and diethyl polypropoxy 2-hydroxy ammonium phosphate available from Degussa under the trademark and designation VARIQUAT CC-42NS, and phosphate acid esters such as RHODAFAC RS-610 and RE 610 available from Rhodia or unsaturated phosphate esters such as MAXEMUL 6106 and 6112 from Uniqema, and the like. The dispersant functions to disperse pigment and filler particles and prevents their agglomeration and settling. The dispersant and/or surfactant are present in a sufficient amount to achieve a continuous void-free film and to facilitate the formation of a homogeneous composition. If too much dispersant is used, adhesion of the coating to the adhesive may be negatively impacted. If too little dispersant is used, the composition may not form a homogeneous mixture. The dispersants are preferably used in an amount of about 0.1 parts by weight or greater based on the weight of the composition, and most preferably about 0.5 parts by weight or greater. The dispersant and/or surfactant are preferably used in an amount of about 10 parts by weight or less, and most preferably about 5 parts by weight or less based on the weight of the composition. Commonly, the concentration of the dispersant is calculated based on the amount of pigment and/or filler. Therefore, the amount of dispersant is preferably about 0.5 parts by weight or greater based on the amount of pigment and filler, more preferably about 1 part by weight or greater. The amount of dispersant is preferably about 75 parts by weight or less based on the amount of pigment and filler, more preferably about 50 parts by weight or less, more preferably about 25 parts by weight or less and most preferably about 10 parts by weight or less. The appropriate amount of dispersant is highly dependent on the surface area of the fillers and pigments and must be adjusted accordingly.

The composition may further comprise a surface active agent present to improve substrate wetting and the appearance of the coating. Any surface active agent which is useful in improving the substrate wetting and appearance of the coating may be used. Preferred surface active agents include those which have limited influence on intercoat adhesion, such as polydimethyl siloxanes with low silicone content, silicone acrylates, silicone-free wetting agents/surfactants, mixtures thereof and the like. More preferred surface active agents include polyether modified polydimethylsiloxanes with low silicone content, silicone acrylates, and silicone-free wetting agents which do not affect intercoat adhesion, siloxanes with various organic functional groups (such as carboxylic acid, amine, hydroxyl, acrylate, methacrylate, vinyl, epoxy, isocyanate, phosphonic acid, mercapto, anhydride, etc.), mixtures thereof and the like. Preferred surface active agents include one or more silicone acrylates, such as available from Tego Chemie (Degussa) under the trademark and designation TEGO RAD 2100, 2200N, 2250, 2300, and 2500 or the BYK UV 3500 series (3500, 3510, 3530, 3570) available from BYK Chemie, or siloxanes with various organic functional groups available under the SILMER series from Siltech Corporation (such as SILMER ACR D-2 or ACR D-208), or polyacrylates such as Modaflow from UCB. The surface active agents are present in the composition in a sufficient amount to improve the surface appearance of the coating, substrate wetting and leveling. Preferably, the surface active agents are present in an amount of about 0.05 parts by weight or greater, even more preferably about 0.1 parts by weight or greater and most preferably about 0.2 parts by weight or greater based on the weight of the composition. The surface active agent is preferably present in an amount of about 2 parts by weight or less and more preferably about 1 part by weight or less based on the weight of the composition.

The composition may further comprise defoamers and/or deaerators. The compositions of the invention may foam during processing which can cause problems with respect to surface and appearance of the coating. Any defoamer and/or deaerator which prevents foaming or the formation of bubbles and which does not negatively impact the adhesive properties of the composition may be used. Preferable defoamers are silicone defoamers, silicone free defoamers, polyacrylate defoamers, mixtures thereof and the like. More preferred defoamers include FOAM BLAST™ 20F, FOAM BLAST™ 30 silicone defoaming compounds and FOAM BLAST™ 550 polyacrylate defoamers available from Emerald; TEGO AIREX™ 920 polyacrylate defoamer and TEGO AIREX™ 980 from Degussa, SILMER ACR™ Di-10 and ACR™ Mo-8 polydimethylsiloxane acrylate copolymer from Siltech Corporation, FOAMEX N™ or TEGO AIREX™ 900 silicone based defoamers available from Degussa or BYK™ 1790 silicone-free defoamer from BYK Chemie. The defoamer/deaerator is present in the compositions of the invention in a sufficient amount to prevent formation of bubbles and/or foam. If too much is used, adhesion to the desired surfaces and adhesives may be negatively impacted. Preferably, the defoamer and/or deaerator are present in an amount of about 0.05 parts by weight or greater based on the weight of the composition and more preferably about 0.1 part by weight or greater. Preferably, the defoamer/deaerator are present in an amount of about 1.0 part by weight or less based on the weight of the composition.

The composition of the invention may further comprise polymerization inhibitors that are present in the composition for the purpose of preventing polymerization prior to exposure to curing conditions. Any polymerization inhibitor which prevents polymerization of the functional groups contained in the composition may be used. In the preferred embodiment where the functional groups polymerize when exposed to free radicals, the following classes of polymerization inhibitors may be used: hydroquinones, phenothiazines, mixtures thereof and the like. Among preferred polymerization inhibitors are 4-methoxyphenol(MEHQ), hydroquinone (HQ), 2,6-di-tert-butyl-4-methylphenol, i.e., butylated hydroxytoluene (BHT), phenothiazine, 2,2,6,6-tetramethyl-4-hydroxypiperidine-1-oxyl, such as XENOXYL™ available from Avecia, 2,2,6,6-tetramethylpiperidinyl-1-oxide (TEMPO), IRGASTAB™ UV 10 from Ciba, ADDITIVE™ 01-468 or GENORAD™ 16 available from Rahn. The most preferable polymerization inhibitor is phenothiazine. The polymerization inhibitor is present in a sufficient amount to inhibit polymerization before exposure to conditions for polymerization. The polymerization inhibitor should not be present in such an amount that when exposed to free radicals as desired, the composition does not undergo polymerization. Preferably, the polymerization inhibitor is present in an amount of about 0.01 weight parts or greater, more preferably about 0.05 weight parts or greater and most preferably about 0.1 weight parts or greater based on the weight of the composition. Preferably, the polymerization inhibitor is present in an amount of about 2 weight parts or less and more preferably about 1 weight part or less based on the weight of the composition.

The composition may further include compounds or polymers which improve the water resistance and/or adhesion of the composition to the substrate disclosed in Baikerikar US Patent Publication 2006/0287408 in paragraph (0047) incorporated herein by reference. The composition may further comprise colloidal silica acrylates or colloidal alumina nanoparticle dispersions in acrylate monomers for the purpose of improving hardness and abrasion resistance as disclosed in Baikerikar, U.S. Patent Publication 2006/0287408 in paragraph (0048) incorporated herein by reference. Flexibilizers or rubber tougheners can also be used to improve the flexibility and adhesion of the coatings. Any flexibilizer or toughener known in the art which improves the flexibility or toughness of the coating and which does not impair the desired properties of the coatings of the invention may be used. Preferred flexibilizers are thermoplastic acrylic bead resins such as the ELVACITE™ thermoplastic acrylic bead resins from Lucite (Ineos Resins) or HYCAR™ liquid butadiene resins from Noveon.

The coating composition preferably has a viscosity which allows it to be processed, that is, pumped and applied and which facilitates the formation of a void-free film when coated on a substrate. The specific viscosity that may be used will be dictated by the application method. For instance, formulations for screen printing will require much higher viscosity than formulations used for ink jet printing. For example, if the composition is applied by screen printing, the composition typically has a viscosity of about 1,000 centipoises or greater. Preferably, the composition has a viscosity of 50,000 centipoise or less. If the composition is applied by ink jet printing, the composition has a viscosity of 5 centipoises or greater. Preferably, the composition has a viscosity of 50 centipoises or less. If the composition is applied by spraying it onto the substrate, the composition has a viscosity of 5 centipoises or greater. Preferably, the composition has a viscosity of 100 centipoises or less.

The composition of the invention may be prepared by contacting the ingredients and blending. The processes and equipment for achieving this are well known to those skilled in the art. The materials are contacted under conditions such that a stable homogeneous dispersion is prepared. Any equipment and process which provides this result may be used. The materials may be contacted at about ambient temperature (about 20-25° C.) to about 60° C. and preferably at ambient temperature. The components may be blended in air and preferably blended in a dry environment to improve the hydrolytic stability of the composition. The materials are blended for a sufficient time to prepare a homogeneous dispersion. Preferably, the materials are blended for about 60 minutes or greater, more preferably about 90 minutes or greater. Preferably, the materials are blended for a period of about 240 minutes or less and more preferably about 180 minutes or less. If the particles and pigments in the dispersion are too large, the coating prepared from the composition may have poor appearance. Therefore, it is desired that the filler and pigment be present in a particle size which allows their dispersion into the composition and which allows the preparation of a void-free continuous coating which has reasonable flexibility and appearance. In the event the particle size is too large, the composition may be subjected to a grinding step. This grinding may occur in any equipment known to those skilled in the art for performing such grinding (i.e. ball milling, horizontal or vertical media milling, sand or pebble milling, etc). Preferably, the particle size is equal to or less than 10 microns and more preferably less than 5 microns. Once, the composition is blended to form a homogeneous solution and the particle sizes are adjusted to the needs of the composition, the coating may be stored. Preferably, the composition is stored in a dry environment to prevent instability. In a preferred embodiment, the fillers and/or pigments are dispersed in a reactive diluent with the aid of dispersants before they are added to the coating compositions of the invention. If the particle size of the pigments or fillers is too large, the dispersions are preferably subjected to a grinding step prior to adding them to the composition of the invention.

The coating may be applied to glass or coated plastic in any means known to those skilled in the art. It may be applied in conventional means such as using a brush, roller, sprayed onto the surface, ink jet printing, screen printing and the like. Preferably, the composition can be applied using robotic application devices. Such devices are well known to those skilled in the art. After application of the coating to the surface of the substrate, the coating is exposed to polymerization conditions, that is, conditions which cause the composition to undergo polymerization. For compositions wherein the functional groups of the film-forming resin and other reactive components are those which react when exposed to free radicals, this means performing some operations which cause the catalyst or initiator to initiate the formation of free radicals and free radical polymerization. In a preferred embodiment, the catalyst or initiator is a photoinitiator and polymerization is initiated by exposing the composition to irradiation, such as ultraviolet light or electronic beam. The energy source used for achieving crosslinking of the radiation functionality may be actinic (e.g the radiation having a wavelength in the ultraviolet or visible region of the spectrum), accelerated particles (e.g., electron beam radiation), thermal (e.g., heat or infrared radiation), or the like. Preferably, the energy source is actinic radiation or accelerated particles, because such energy source provides excellent control over the initiation and rate of crosslinking. Additionally, actinic radiation and accelerated particles can be used for curing at relatively low temperatures. This avoids degrading components that might be sensitive to the relatively high temperatures that might be required to initiate crosslinking of the radiation curable groups when using thermal curing techniques. Suitable sources of actinic radiation include mercury lamps, electrodeless lamps, xenon lamps, carbon arc lamps, tungsten filament lamps, lasers, electron beam energy, sunlight, and the like. Ultraviolet radiation, especially from xenon lamps, medium pressure mercury lamps or electrodeless lamps is most preferred. Preferably, the initiator is a photoinitiator and in this embodiment, polymerization is initiated by exposure to ultraviolet radiation. The amount of radiation to which the composition is exposed is that amount which results in initiation of free radical polymerization in the presence of a photoinitiator and provides the desired final properties of the coating. The coatings can be applied by screen printing, spray means, the use of felt or a roller and the like. Preferably, the coating once cured exhibits a thickness of about 5 microns or greater and more preferably 10 microns or greater. Preferably, the coating once cured exhibits a thickness of about 100 microns or less, more preferably about 75 microns or less, and most preferably about 50 microns or less. In one embodiment the coatings of the invention can be subjected to further curing conditions. The films can be exposed to thermal curing conditions after completion of the free radical polymerization. Preferably, the films can be post cured at a temperature of about 110° C. to about 200° C. Preferable thermal curing times range from about 5 to about 60 minutes. In the event the formulation contains ingredients with low glass transition temperatures, care needs to be taken to avoid thermal curing conditions which cause such materials to melt.

In another embodiment, the invention is glass or abrasion resistant coated plastic having a cured coating of the invention deposited on the surface. The glass or plastic can be flat or shaped. Included in shaped glass is glass having a curved surface. Glass or coated plastic with a coating of the invention disposed thereon can be used for any use for which glass or coated plastic is known to be used by one skilled in the art. Preferably, the glass or coated plastic is used as a window and the coating is found on the periphery of the window. Preferably, the coating is located about the periphery of the window such that it is capable of blocking transmission of light to prevent it from contacting the adhesive, which bonds the window into a structure. The coating on the periphery also hides the trim components disposed about the periphery of the window. Preferably, the coating exhibits an ultraviolet light transmission of about 1 percent or less of the light to which the coating is exposed to and more preferably about 0.5 percent or less. In a preferred embodiment, the glass is curved and the advantage of the coating of the invention is that the coating can be deposited on the glass after the glass is shaped. Preferably, the glass is pre-shaped prior to application of the coating. Preferably, the cured coating demonstrates an abrasion resistance such that after 500 cycles according to ASTM D1044 test the coating retains a light transmittance of less than 1 percent. Preferably, the coating demonstrates an abrasion resistance of about $\Delta$ T<1 percent, more preferably about $\Delta$ percent T<0.75 percent, and most preferably about $\Delta$ percent T<0.5 percent, as determined according to the test ASTM D1044.

The coated glass or plastic is preferably used as a window and preferably used as a window in an automobile or a building. FIG. 1 illustrates a window according to the invention. FIG. 1 further illustrates a window (10) with a coating of the invention (11) located about the periphery of the window (10).

Figure 2:
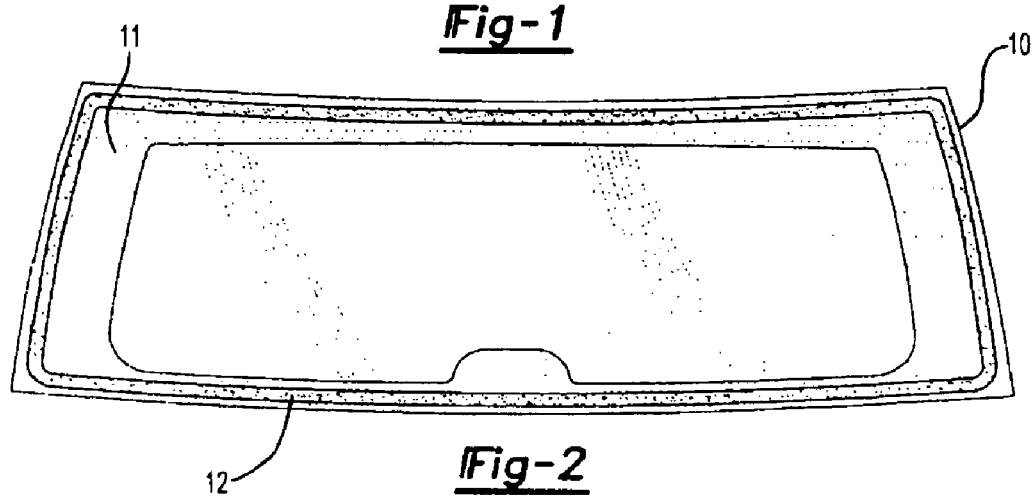
FIG. 2 shows a window with the coating, adhesive and a portion of the structure to which it is bonded.

In another embodiment, the invention is a window made of glass or coated plastic with a cured coating disposed about the periphery of the window and an adhesive applied to the coating. FIG. 2 illustrates one embodiment of this invention, wherein a window (10) has located on it a coating of the invention (11) and applied to the coating of the invention on the window is a bead of adhesive (12). The bead of adhesive (12) is disposed about the periphery of the window (10) such that it forms a continuous bead of adhesive (12) which is capable of completely sealing around the periphery of the window. The seal is preferably water tight.

The adhesive bead located about the periphery of the window can be any known adhesive for glass bonding useful in bonding windows into structures. Preferably in one embodiment, the adhesive can be any adhesive having isocyanate functional groups or having silicon atoms with hydrolyzable groups attached to the silicon atom or combination thereof, preferably the adhesives cure when exposed to moisture. The system of the invention can utilize any isocyanate functional adhesive which is designed for bonding to non-porous surfaces such as metal, coated plastic and/or glass. Examples of useful adhesive systems are disclosed in U.S. Pat. Nos. 4,374,237, 4,687,533, 4,780,520, 5,063,269, 5,623,044, 5,603,798, 5,852,137, 5,976,305, 5,852,137, 6,512,033, relevant portions incorporated herein by reference. Examples of commercial adhesives which may be used herein are BETASEAL™ 15630, 15625, 61355, U401 (HV), Express, One adhesives available from The Dow Chemical Company, EFBOND™ windshield adhesives available from Eftec, WS 151™, WS212™ adhesives available from Yokohama Rubber Company, SIKAFLEX™ adhesives available from Sika Corporation and adhesives based on Kaneka's MS Polymer silane functional polyether prepolymers.

In one embodiment, the adhesive is a polymer having a reactive silicon group which includes reactive silanes capable of silanol condensation. The terminology "reactive silicon group" or "reactive silane capable of silanol condensation" means a silicon-containing group in which a hydrolyzable group or a hydroxyl group is bonded to the silicon atom and which is cross-linkable through silanol condensation reaction. In one embodiment, the adhesive composition of the invention contains a polymer having a flexible backbone and having silane moieties capable of silanol condensation. The polymer with a flexible backbone can be any polymer with a flexible backbone which can be functionalized with a silane capable of silanol condensation. Among preferred polymer backbones are polyethers, polyurethanes, polyolefins and the like. Among more preferred polymer backbones are the polyethers and polyurethanes. Examples of such adhesive compositions are those disclosed in Mahdi, U.S. 2002/01550 A1, incorporated herein by reference. In some embodiments, the polymers useful in the invention are polymers as disclosed in Yukimoto et al., U.S. Pat. No. 4,906,707; Iwakiri et al., U.S. Pat. No. 5,342,914; Yukimoto, U.S. Pat. No. 5,063,270; Yukimoto et al., U.S. Pat. No. 5,011,900; or Suzuki et al., U.S. Pat. No. 5,650,467, all incorporated herein by reference. More preferably, such polymers are oxyalkylene polymers containing at least one reactive silicon group per molecule.

The hydrolyzable group is not particularly limited and is selected from conventional hydrolyzable groups. Specific examples are a hydrogen atom, a halogen atom, an alkoxy group, an acyloxy group, a ketoximate group, an amino group, an amido group, an acid amido group, an amino-oxy group, a mercapto group, and an alkenyloxy group. Preferred among them are a hydrogen atom, an alkoxy group, an acyloxy group, a ketoximate group, an amino group, an amido group, an amino-oxy-group, a mercapto group, and an alkenyloxy group. An alkoxy group is more preferred with a methoxy or ethoxy group being most preferred, for ease in handling, due to their mild hydrolyzability. One to three hydroxyl groups or hydrolyzable groups may be bonded to one silicon atom. Where two or more hydroxyl groups or hydrolyzable groups are present per reactive silicon group, they may be the same or different. The reactive silicon group may have one or more silicon atoms.

In one embodiment, the flexible polymer used in the adhesive composition is a silyl terminated prepolymer prepared by contacting a polyol as described herein with an isocyanato silane having at least one silane moiety, which has bonded thereto a hydrolyzable moiety under conditions, such that the hydroxyl moieties of the polyol react with the isocyanate moieties of the isocyanatosilane, so as to place a terminal silane moiety on the polyol and preferably the contacting is performed without addition of catalyst. Such isocyanato silane requires a silane group with a hydrolyzable moiety attached thereto and are described in U.S. Pat. No. 4,618,656 at column 3, lines 24 to 34, incorporated herein by reference. The reaction of the polyol with an organo functional silane can be performed using conventional processes such as those disclosed in U.S. Pat. No. 4,625,012, incorporated herein by reference. In another embodiment, the polymer may be a polyurethane based backbone having hydrolyzable silane groups. Such materials are disclosed in Chang, U.S. Pat. No.

4,622,369 and Pohl, U.S. Pat. No. 4,645,816, relevant portions, incorporated herein by reference. In another embodiment, the backbone can be a flexible polymer such as a polyether or polyolefin, having silicon moieties having bound thereto. A flexible polymer with unsaturation can be reacted with a compound having a hydrogen or hydroxyl moiety bound to silicon wherein the silicon moiety also has one or more carbon chains with unsaturation as described in Kawakubo, U.S. Pat. No. 4,788,254, column 12, lines 38 to 61; U.S. Pat. Nos. 3,971,751; 5,223,597; 4,923,927; 5,409,995 and 5,567,833, incorporated herein by reference. The polymer prepared can be crosslinked in the presence of a hydrosilylation crosslinking agent and hydrosilylation catalyst as described in U.S. Pat. No. 5,567,833 at column 17, lines 31 to 57, and U.S. Pat. No. 5,409,995, incorporated herein by reference.

The prepolymer is present in the adhesive composition in a sufficient amount such that the adhesive is capable of bonding glass or coated plastic to another substrate, such as metal, plastic, a composite or fiberglass. Preferably, the prepolymer is present in an amount of about 30 percent by weight or greater based on the weight of the adhesive, more preferably about 40 percent by weight or greater, even more preferably about 45 percent by weight or greater and most preferably about 50 percent by weight or greater. More preferably, the prepolymer is present in an amount of about 99.8 percent by weight or less based on the weight of the adhesive and most preferably about 85 percent by weight or less.

The adhesive composition containing siloxy functional groups further comprises one or more catalysts known to one skilled in the art which catalyzes the silanol condensation reaction. Preferred catalysts are tin catalysts which are well known in the art, see U.S. 2002/0100550, paragraph [0042], incorporated herein by reference. The amount of catalyst in the adhesive formulation is preferably about 0.01 percent by weight or greater, more preferably about 0.1 percent by weight or greater, and most preferably about 0.2 percent by weight or greater, and preferably about 5 percent by weight or less, even more preferably about 1.0 percent by weight or less, even more preferably 0.5 percent by weight or less and most preferably about 0.4 percent by weight or less. The adhesive composition may further comprise a curing agent for the siloxy moiety such as a hydrolyzable silicon compound as described in U.S. Publication 2002/0100550, paragraphs [43-47]. The hydrolyzable silicon compound is used in an amount of from about 0.01 to about 20 parts by weight, and preferably from about 0.1 to about 10 parts by weight, per 100 parts by weight of the flexible polymer having a reactive silicon group and capable of crosslinking on siloxane bond formation. If it exceeds about 20 parts by weight, the elastomeric properties after curing are adversely affected. Further examples of such hydrolyzable silicone compounds capable of crosslinking, the silicone reactive polymer is disclosed in U.S. Pat. No. 5,541,266, incorporated herein by reference. Other such potential additives include organic silicone compounds B as disclosed in U.S. Pat. No. 4,837,274, see column 7, line 12 to column 9, line 15, incorporated herein by reference.

The polyisocyanate functional adhesives useful in the invention generally comprise a prepolymer having isocyanate functionality, a catalyst for the cure of the prepolymer and other additives well known to those skilled in the art. The prepolymers used in the invention can be conventional prepolymers used in polyurethane adhesive compositions. In a preferred embodiment, the prepolymers are blended with a compound or polymer having silane functionality. In another preferred embodiment, the prepolymer contains silane functionality as well as isocyanate functionality. A urethane prepolymer having silane functionality may be used as the entire prepolymer used in the adhesive or it may be blended with a prepolymer which does not have silane functionality.

The isocyanate content in the prepolymers is preferably in the range of about 0.1 percent to about 10 percent, more preferably in the range of about 1.0 percent to about 5.0 percent and most preferably in the range of about 1.5 percent to about 3.0 percent. The isocyanate functional prepolymer is present in the adhesive composition in a sufficient amount such that the adhesive is capable of bonding glass or coated plastic to the desired substrate such as metal, plastic, fiberglass or composites. Preferably, the isocyanate functional prepolymer is present in an amount of about 20 parts by weight or greater based on the weight of the adhesive composition, more preferably about 30 parts by weight or greater and most preferably about 40 parts by weight or greater. Preferably, the isocyanate functional prepolymer is present in an amount of about 99.8 parts by weight or less based on the weight of the adhesive composition, more preferably about 98 parts by weight or less and most preferably about 85 parts by weight or less.

In many embodiments where the adhesive is an isocyanate functional prepolymer based adhesive, it is desirable to have a silane present in some form. Preferable methods of including silane functionality in the adhesive formulations are disclosed in Wu et al., U.S. Pat. No. 6,512,033 at column 5, line 38 to column 7, line 27; U.S. Pat. Nos. 5,623,044; 4,374,237; 4,345,053 and 4,625,012, relevant portions incorporated herein by reference. The amount of silane present is that amount which enhances the adhesion of the adhesive to the substrate surface. The amount of silane present is preferably about 0.1 parts by weight or greater based on the weight of the adhesive and most preferably about 0.5 parts by weight or greater. The amount of silane used is preferably about 10 parts by weight or less and most preferably about 2.0 parts by weight or less.

The adhesive also contains a catalyst which catalyzes the reaction of isocyanate moieties with water or an active hydrogen containing compound. The catalyst can be any catalyst known to the skilled artisan for the reaction of isocyanate moieties with water or active hydrogen containing compounds. Among preferred catalysts are organotin compounds, metal alkanoates, and tertiary amines, such as dimorpholinodialkyl ethers. Included in the useful organotin catalysts are compounds such as alkyl tin oxides, stannous alkanoates, dialkyl tin carboxylates and tin mercaptides. Stannous alkanoates include stannous octoate. Alkyl tin oxides include dialkyl tin oxides, such as dibutyl tin oxide and its derivatives. The organotin catalyst is preferably a dialkyltin dicarboxylate or a dialkyltin dimercaptide. The preferred dialkyl dicarboxylates include 1,1-dimethyltin dilaurate, 1,1-dibutyltin diacetate and 1,1-dimethyl dimaleate. The organotin catalyst is present in an amount of about 60 parts per million or greater based on the weight of the adhesive and more preferably 120 parts by million or greater. The organotin catalyst is present in an amount of about 1.0 part by weight or less based on the weight of the adhesive, more preferably about 0.5 parts by weight or less and most preferably about 0.1 parts by weight or less.

Among preferred tertiary amines are dimorpholinodialkyl ether, a di((dialkylmorpholino)alkyl)ether, bis-(2-dimethylaminoethyl)ether, triethylene diamine, pentamethyldiethylene triamine, N,N-dimethylcyclohexylamine, N,N-dimethyl piperazine 4-methoxyethyl morpholine, N-methylmorpholine, N-ethyl morpholine, and mixtures thereof; and metal alkanoates, such as bismuth octoate or bismuth neodecanoate and the like. More preferred tertiary amine is dimorpholinodiethyl ether or (di-(2-(3,5-dimethyl-morpholino)ethyl) ether). Tertiary amines are preferably employed in an amount, based on the weight of the adhesive, of about 0.01 parts by weight or greater based on the adhesive, more preferably about 0.05 parts by weight or greater, even more preferably about 0.1 parts by weight or greater and most preferably about 0.2 parts by weight or greater and about 2.0 parts by weight or less, more preferably about 1.75 parts by weight or less, even more preferably about 1.0 parts by weight or less and most preferably about 0.4 parts by weight or less.

The adhesive composition may further comprise a stabilizing amount of an organophosphite as disclosed in U.S. Patent Publication 2006/0287408 at paragraphs [0072] and [0073], incorporated herein by reference. Preferably, the organophosphite is present in the adhesive in an amount of about 0.1 percent by weight or greater and more preferably about 0.2 percent by weight or greater. Preferably, the organophosphite is present in the adhesive in an amount of about 1.0 percent by weight or less and more preferably about 0.5 percent by weight or less.

In a preferred embodiment, the adhesive includes a light stabilizer. Any light stabilizer which facilitates the system maintaining a durable bond to the substrate for a significant portion of the life of the structure to which it is bonded may be used. Preferred light stabilizers are hindered amine light stabilizers such as those disclosed in U.S. Patent Publication 2006-028704 paragraph [0074] incorporated herein by reference. A sufficient amount of light stabilizer to enhance the bond durability to the substrate may be used. Preferably, the light stabilizer is used in an amount of about 0.1 parts by weight or greater, based on the weight of the adhesive composition or clear primer, more preferably about 0.2 parts by weight or greater and most preferably about 0.3 parts by weight or greater. Preferably, the amount of light stabilizer present is about 3 weight parts or less, based on the weight of the adhesive composition or clear primer, more preferably about 2 weight parts or less and most preferably about 1 weight parts or less.

The adhesive formulation may contain other additives commonly used in adhesive formulations as known to those skilled in the art. The adhesive formulation may be formulated with fillers known in the art for use in adhesive compositions. By the addition of such materials, physical properties such as viscosity, flow rates, sag and the like can be modified. However, to prevent premature hydrolysis of the moisture sensitive groups of the prepolymer, it is preferable to thoroughly dry the fillers before addition to the adhesive compositions. Optional components of the adhesive useful in the invention include reinforcing fillers. Such fillers are well known to those skilled in the art and include carbon black, titanium dioxide, calcium carbonate, surface treated silica, titanium oxide, fumed silica and talc. The reinforcing fillers are used in a sufficient amount to increase the strength of the adhesive and to provide thixotropic properties to the adhesive. Preferably, the reinforcing filler is present in an amount of about 1 part by weight of the adhesive composition or greater, more preferably about 15 parts by weight or greater and most preferably about 20 parts by weight or greater. Preferably, the reinforcing filler is present in an amount of about 40 parts by weight of the adhesive composition or less, more preferably about 35 parts by weight or less and most preferably about 33 parts by weight or less. Among optional materials in the adhesive compositions are clays. Preferred clays useful in the invention include kaolin, surface treated kaolin, calcined kaolin, aluminum silicates and surface treated anhydrous aluminum silicates. The clays can be used in any form which facilitates formulation of a pumpable adhesive. Preferably, the clay is the form of pulverized powder, spray dried beads or finely ground particles. Clays may be used in an amount of about 0 part by weight of the adhesive composition or greater, more preferably about 1 part by weight or greater and even more preferably about 6 parts by weight or greater. Preferably, the clays are used in an amount of about 20 parts by weight or less of the adhesive composition and more preferably about 10 parts by weight or less.

The adhesive compositions useful in this invention may further comprise plasticizers so as to modify the rheological properties to a desired consistency. Such materials are preferably free of water, inert to reactive groups and compatible with the polymer used in the adhesive. Preferable plasticizers are well known in the art and preferable plasticizers include alkyl phthalates such as dialkyl phthalate, wherein the alkyl phthalate is linear with mixed $C_7$, $C_9$ and $C_{11}$ alkyl groups, diisononyl phthalate, diisododecyl phthalate, dioctylphthalate or dibutylphthalate. The amount of plasticizer in the adhesive composition is that amount which gives the desired rheological properties and which is sufficient to disperse the catalyst and other components in the system and to provide the desired viscosity. The amounts of plasticizer disclosed herein include those amounts added during preparation of the prepolymer and during compounding of the adhesive. Preferably, plasticizers are used in the adhesive composition in an amount of about 0 part by weight or greater based on the weight of the adhesive composition, more preferably about 5 parts by weight or greater, even more preferably about 10 parts by weight or greater and most preferably about 20 parts by weight or greater. The plasticizer is preferably used in an amount of about 45 parts by weight or less based on the total amount of the adhesive composition, more preferably about 40 parts by weight or less, even more preferably about 30 parts by weight or less and most preferably about 25 parts by weight or less.

The adhesive compositions useful in this invention may further comprise stabilizers which function to protect the adhesive composition from moisture, thereby inhibiting advancement and preventing premature crosslinking of the polymer capable of crosslinking in the adhesive formulation. Included among such stabilizers are hydrocarbyl alkoxysilanes, such as vinyl trimethoxysilane, diethylmalonate and alkylphenol alkylates. Such stabilizers are preferably used in an amount of about 0.1 part by weight or greater based on the total weight of the adhesive composition, preferably about 0.5 part by weight or greater and more preferably about 0.8 part by weight or greater. Such stabilizers are used in an amount of about 5.0 parts by weight or less based on the weight of the adhesive composition, more preferably about 2.0 parts by weight or less and most preferably about 1.4 parts by weight or less.

The adhesive compositions used in the invention may further comprise an adhesion promoter known to those skilled in the art, such as those described in Mahdi et al., U.S. Pat. No. 6,828,403, column 11, line 50 to column 12, line 57 and Wu, U.S. Pat. No. 6,512,033 at col. 5 line 38 to column 6 and 7, line 35, both incorporated herein by reference. Such additional adhesion promoters are present in a sufficient amount to promote the adhesion of the adhesive to the glass or other substrate surface to the desired level usually determined by testing the lap shear strength and failure mode of the bond to the substrate. Preferably, the amount of adhesion promoter is about 10 parts by weight or less based on the weight of the adhesive; more preferably about 5 parts by weight or less and most preferably about 2 parts by weight or less. Preferably, the amount of adhesion promoter is about 0.01 part by weight or greater based on the weight of the adhesive; more preferably about 0.1 part by weight or greater and most preferably about 0.5 part by weight or greater.

The adhesive compositions can also contain heat stabilizers known in the art. Among preferred heat stabilizers are alkyl substituted phenols, phosphites, sebacates and cinnamates. Preferably, the amount of heat stabilizer is about 5 parts by weight or less based on the weight of the adhesive; more preferably about 2 parts by weight or less and most preferably about 1.0 part by weight or less. Preferably, the amount of heat stabilizer is about 0.01 part by weight or greater based on the weight of the adhesive; and most preferably about 0.5 part by weight or greater. In another preferred embodiment, the adhesive compositions used may further comprise an ultraviolet light absorber. Any ultraviolet absorber which enhances the durability of the bond of the adhesive to the substrate may be used. Preferred UV light absorbers include benzophenones and benzotriazoles. More preferred UV light absorbers are disclosed in U.S. Patent Publication 2006-0287408 in paragraph [0079], incorporated herein by reference. Preferably, the UV light absorber is used in a sufficient amount to enhance the durability of the bond of the adhesive to the substrate. Preferably, the UV absorber is used in an amount of about 0.1 parts by weight or greater based on the weight of the adhesive composition, more preferably about 0.2 weight parts or greater and most preferably about 0.3 parts by weight or greater. Preferably, the UV light inhibitor is used in an amount of about 3 parts by weight or less based on the weight of the adhesive composition, more preferably about 2 parts by weight or less and most preferably about 1 parts by weight or less.

For formulating adhesive compositions, the one or more prepolymers and the silane containing compound, if present, are combined, preferably with fillers and additives known in the prior art for use in elastomeric compositions. By the addition of such materials, physical properties such as viscosity, flow rate, sag, and the like can be modified. However, to prevent premature hydrolysis of the moisture sensitive groups of the polymer, the filler should be thoroughly dried before admixture therewith. Other components commonly used in adhesive compositions may be used in the adhesive composition used in this invention. Such materials are well known to those skilled in the art and may include antioxidants.

The method of bonding glass or coated plastic, such as a window, to a substrate comprises, applying an adhesive to the surface of the glass or coated plastic along the portion of the glass or coated plastic which is to be bonded to the structure which has the composition of this invention coated thereon. The adhesive is thereafter contacted with the second substrate such that the adhesive is disposed between the glass or coated plastic and the second substrate. Alternatively, the adhesive may be applied to the other substrate, such as a window flange. Thereafter, the window and the window flange are contacted with the adhesive disposed between them. The adhesive is allowed to cure to form a durable bond between the glass or coated plastic and the substrate. In a preferred embodiment, one substrate is glass or coated plastic with an abrasion resistant coating (coated plastic) and the other substrate is a plastic, metal, fiberglass or composite substrate (for instance cured sheet molding compound) which may optionally be painted. This method is especially effective for substrates painted with an acid resistant paint. Generally, the adhesives are applied at ambient temperature in the presence of atmospheric moisture. Exposure to atmospheric moisture is sufficient to result in curing of the adhesive. Curing may be further accelerated by applying heat to the curing adhesive by means of convection heat or microwave heating. The coated plastic with an abrasion resistant coating can be any plastic which is clear, such as polycarbonate, acrylics, hydrogenated polystyrene or hydrogenated styrene conjugated diene block copolymers having greater than 50 percent styrene content. The abrasion resistant coating can comprise any coating which is abrasion resistant, such as a polysiloxane coating. Preferably, the coating has an ultraviolet pigmented light blocking additive. Typically, the adhesive can be applied shortly after the coating is cured. The adhesive can be applied up to a year after the coating is applied and cured on the substrate.

In another embodiment of the invention, a clear composition according to this invention can be used as a clear abrasion resistant coating on a clear plastic substrate. Such coating should not contain a pigment which introduces opacity to the coating when cured. Thus, the clear plastic substrate with a cured coating of the invention deposited thereon can be used as a window in a structure. The coating provides abrasion resistance to the clear plastic. The clear coating can contain a known ultraviolet light blocking additive. A coating according to the invention containing a pigment which introduces opacity can thereafter be applied to the surface of the coated plastic window about the periphery of the window or on one entire face of a window.

In another embodiment, the adhesive can be a cure-on-demand adhesive comprising a flexible backbone having functional groups and which further comprises an encapsulated curing agent for the adhesive. Such an adhesive is disclosed in U.S. Pat. No. 6,355,127, relevant portions incorporated herein by reference. The cure-on-demand adhesive can be applied at a time and place remote from installation of the window into the structure. Typically, the adhesive just prior to contacting the window with the structure is exposed to conditions which cause the release of the encapsulated curing agent to begin curing of the adhesive. This is typically done by exposing the adhesive to heat which melts the encapsulating agent and releases the curing agent, thereby beginning the cure of the adhesive. In another embodiment, the adhesive can be a slow curing polyurethane adhesive containing crystalline polyester. Such adhesive is heated prior to contacting the window with the structure into which it is bonded so as to give the adhesive hot melt properties and to provide rapid green strength upon cooling. Such an adhesive can be shipped from a remote location to the location wherein the window would be contacted with the structure.

Figure 3:
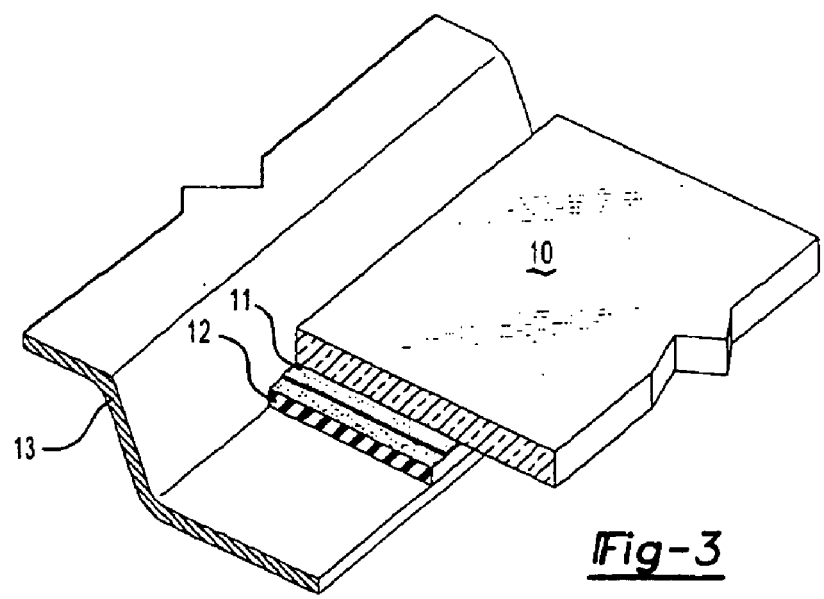
FIG. 3 shows a cross-sectional view of a window frame, window, window coating and adhesive.
Figure 4:
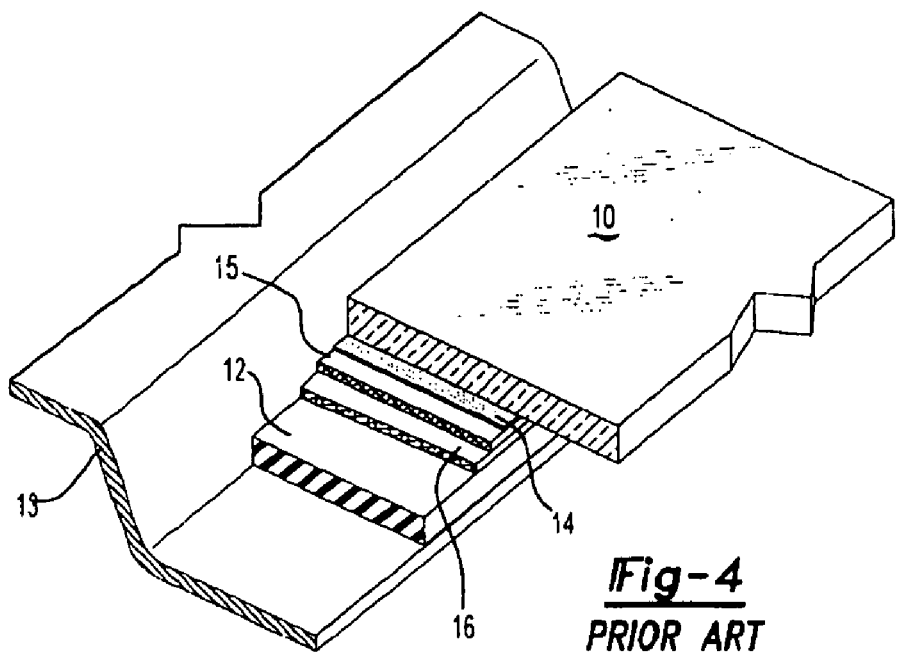
FIG. 4 illustrates the prior art with respect to a window frame, window frame, window coating and adhesive.

In another embodiment, the invention is a structure with glass or abrasion resistant coated plastic having a cured coating composition of the invention deposited thereon bonded by an adhesive to the structure. The glass or coated plastic is preferably a window and the structure is preferably an automobile or building. FIG. 3 illustrates a stepped cross section of the bond between the structure and the window. The figure shows the glass (10) and the organic coating of the invention (11). Located adjacent to the organic coating of the invention (11) is the adhesive (12) and the flange of the structure (13) to which it is bonded. FIG. 4 shows a cross section of the prior art bonding method. The glass (10), a ceramic enamel frit (14), clear primer layer (15), a black-out primer layer (16), the adhesive (12) and the flange (13) of the structure as shown.

Figure 5:
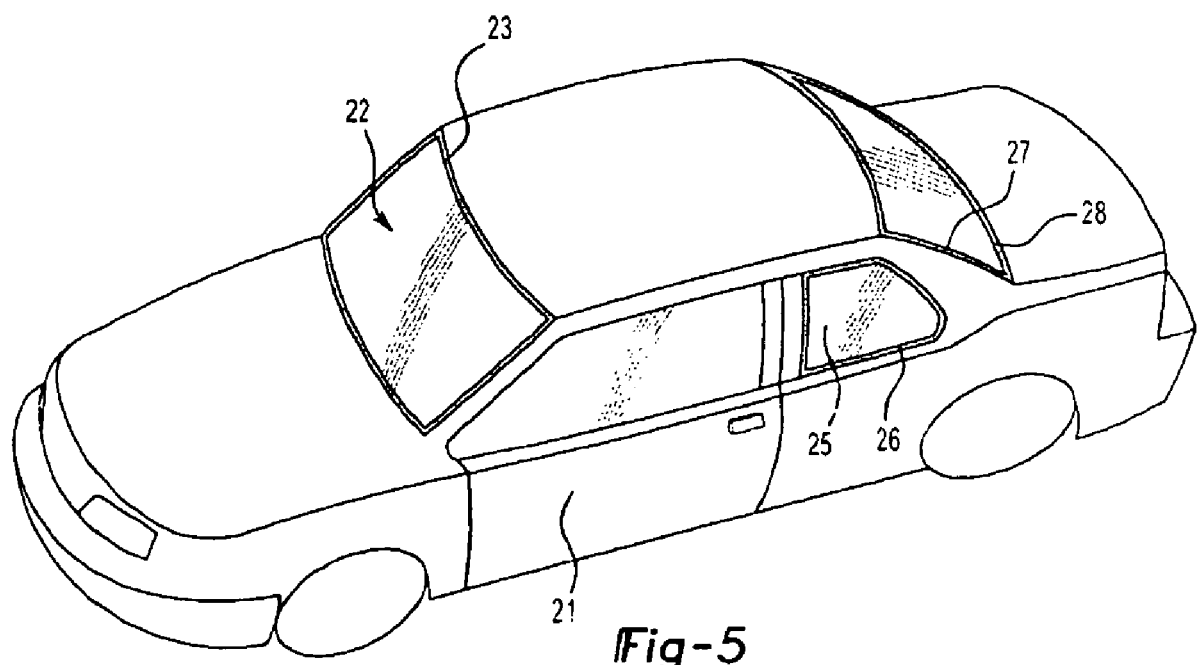
FIG. 5 illustrates where the compositions of the invention are used on an automobile.

In another embodiment, the structure is an automobile. FIG. 5 illustrates an automobile having glass bonded into the automobile. The automobile (21) is shown having a windshield (22) with a coating of the invention (23) around the periphery. Also, shown is a bonded in quarter glass (25) having a coating of the invention (26) disposed around the periphery of the quarter glass. Also, illustrated is a back light (27) having a coating of the invention located (28) around the back light (27).

Generally, the window is placed in the structure by the following process. The process starts with a window having a coating of the composition of the invention disposed on the periphery of the window wherein the composition is cured. Such a window has the coating of the invention around the periphery of the window with an adhesive bead as described herein as applied around the periphery of the window on the coating. The window with the adhesive deposited thereon is contacted with a window flange with the adhesive located between the window and the structure. The adhesive is allowed to cure. In vehicles, quarter glass, windshields, back lights and sunroofs may be bonded in using the coatings and system of the invention.

In reference to polyurethane prepolymers, average isocyanate functionality and molecular weight are determined according to Wu, U.S. Pat. No. 6,512,033 at column 11, lines 3 to 29 and Bhat, U.S. Pat. No. 5,922,809 at column 12, lines 65 to column 13, line 26, incorporated herein by reference.

The compositions of the invention can be used to repair defective or damaged coatings or frits. The coatings can be organic, inorganic or a mixture thereof. The compositions of the invention can be applied to the damaged or defective portion of the coating and exposed to curing conditions. For instance, a damaged ceramic enamel about the periphery of a window can be repaired using the coatings of the invention. The color of the repaired coating can be matched by the compositions of the invention. The compositions can be used in any application which calls for a coating on glass or a clear plastic; for instance, buildings transportation vehicles, furniture, appliances, containers (beverages, household products, etc.) and the like.

Specific Embodiments of Invention

The following examples are included for illustrative purposes only and are not intended to limit the scope of the invention. Unless otherwise stated, all parts and percentages are by weight.

Ingredients

SR 9003™ Propoxylated neopentyl glycol diacrylate available from Sartomer;
SR 506™ Isobornyl acrylate available from Sartomer;
SR 9020™ HP Propoxylated glyceryl triacrylate available from Sartomer;
CN 983™ Aliphatic urethane diacrylate oligomer available from Sartomer;
Adduct is an adduct of SR 9003™ propoxylated neopentyl glycol diacrylate and
DYNASYLAN™ 1122 bis[(triethoxysilyl) propyl] amine available from Degussa/Evonik;
Acrylic acid available from ACROS and The Dow Chemical Company;
VARIQUAT™ CC-42NS diethylpolypropoxy methyl ammonium chloride dispersant used to disperse carbon black available from Degussa;
RHODAFAC™ RS-610 phosphate acid esters dispersant used to disperse alumina available from Rhodia;
ESACURE™ KTO 46 2,4,6-trimethylbenzyl-diphenyl-phosphine oxide photoinitiator blend available from Sartomer;
ESACURE™ TZT benzophenone photoinitiator blend available from Sartomer;
Z6300 vinyltrimethoxysilane available from Dow Corning;
PTZ™ phenothiazine free radical polymerization inhibitor available from Cytec Industries;
MOGUL™ E carbon black available from Cabot Corporation;
RC LS DBM™ alumina available from Baikowski-Malakoff;
50 percent S-395N1™ polyethylene wax powder available from Shamrock dispersed in isobornyl acrylate;
TEGO™ RAD 2300 Siloxane acrylate wetting agent available from Tego Chemie (Degussa);
FOAM BLAST™ 30 Polydimethylsiloxane defoamer available from Lubrizol/Noveon;
SILAMINE™ AS Aminoethylaminopropyl silicone solubilized with polyether;
SILAMINE™ D10-D Hydrophobic tertiary silicone amine;
SILMER™ OH J10 hydroxyl functional silicone;
SILUBE™ CS-1 Succinic-based carboxylate silicone in free acid;
SILMER™ H Di E2 Linear difunctional and multi-functional silicone hydride prepolymer;
SILMER™ NCO Di-10 Linear difunctional isocyanate terminated silicone pre-polymer;
SILPHOS™ A-100 silicone polyether phosphate ester in free acid form (Phosphonic acid);
SILMER™ ACR Di-10 Linear difunctional acrylate terminated silicone pre-polymer;
SILMER™ ACR D2 acrylated siloxane with hydroxyl groups;
SILMER™ EP Di10 Linear epoxy functional siloxane;
SILUBE™ CP-1 carboxylic acid functional siloxane;
SILAMINE™, SILMER™, SILUBE™ and SILPHOS™ products are available from Siltech Corporation;
DC-2737 Linear difunctional silanol terminated silicone prepolymer available from Dow Corning;
Z-6106™ blend of a melamine resin and an epoxy silane (gamma-glycidyloxypropyl trimethoxysilane) available from Dow Corning Corporation;
CYMEL™ 303 ULF melamine resin;
CYMEL 300 methylated melamine-formaldehyde resin;
CYMEL 1135 and 1168 methylated/n-butylated melamine-formaldehyde resins;
CYMEL 327 high imino melamine-formaldehyde resin;
CYMEL 370 partially alkylated melamine-formaldehyde resins;
CYMEL 1170 Fully butylated glycoluril formaldehyde resin;
CYMEL resins are available from Cytec Industries;
BMA 200, BMA 222, BMA 250, and BMA 300 melamine triacrylate oligomers;
BMM 215 melamine trimethacrylate oligomer;
BMA a XMA 224 melamine pentaacrylate oligomer;
BMA 220 melamine monoacrylate oligomer:
XMA 221 melamine diacrylate oligomer:
The BM series of melamine acrylate oligomers are available from Bomar Specialties;
SILQUEST™ A-187 gamma-glycidyloxypropyl trimethoxysilane;
BETASEAL™ 15625 high modulus, silyl-modified urethane adhesive with terminal aliphatic and aromatic isocyanates (Adhesive 1);
BETASEAL™ 15685 high modulus, urethane adhesive with terminal aliphatic and aromatic isocyanates (Adhesive 2);
BETASEAL™ 15845 low modulus urethane adhesive with terminal aromatic isocyanates (Adhesive 3);
BETASEAL™15625N high modulus, silyl-modified urethane adhesive with terminal aliphatic and aromatic isocyanates (hereinafter Adhesive 4);
BETASEAL™ 15630N high modulus, urethane adhesive with terminal aliphatic and aromatic isocyanates (hereinafter Adhesive 5);

BETASEAL™ 15845N low modulus urethane adhesive with terminal aromatic isocyanates;

BETASEAL adhesives are available from The Dow Chemical Company;

IRGACURE 379 alpha-amino ketone free radical photoinitiator available from Ciba Specialties;

TINUVIN 123 bis(1-octyloxy-2,2,6-tetramethyl-4-piperidyl) sebacate hindered amine light stabilizer available from Ciba Specialties;

TINUVIN 400 a mixture of 2-[4-[(2-hydroxy-3-dodecyloxypropyl)oxy]-2-hydroxyphenyl]-4,6-bis(2,4-dimethylphenyl)-1,3,5-triazine and 2-[4-[(2-hydroxy-3-tridecyloxypropyl)oxy]-2-hydroxyphenyl]-4,6-bis(2,4-dimethylphenyl)-1,3,5-triazine (85 percent in 1-methoxy-2-propanol) ultraviolet absorber available from Ciba Specialties; and Adhesive 7 is an adhesive containing Kaneka SAX-400 trifunctional polypropyleneoxide polyether with dimethoxymethyl silyl terminal groups having a molecular weight of about 20,000.

Coating Application and UV Curing

Soda lime float glass substrates from Cat-I Manufacturing (4 inches (10 cm)×4 inches (10 cm)×5 mm thick) are cleaned with an isopropanol-soaked cotton wipe to remove any surface contaminants prior to application of the coating. After cleaning the glass substrates, the coating composition is applied on the "tin-side" of the glass (the tin-side of the glass substrate is the side that has a partial layer of tin oxide and shines light blue when exposed to a fluorescent lamp) using a number 9 wire wound rod (from Paul N. Gardner Company, Inc.) to yield a dry film coating thickness of 13±2 microns (final coating thickness confirmed via profilometry). In some cases, the coatings are applied via screen printing using a number 255 mesh screen (coating thickness of 13±2 microns). After a contact time of 1 minute, the coating is UV cured in air in less than 10 seconds with 1 pass at 10 feet/minute using a 600 W/inch Fusion D bulb (Fusion UV System) and 1.5 inch lamp-to-part distance (LPD). Specific irradiance and dosage conditions are measured with a Power Puck radiometer from EIT, Inc., as shown in Table 1.

TABLE 1

Irradiance & Dosage Levels for 600 W/inch Fusion D Bulb, 10 ft/min (3 meters/minute) line speed, 1.5 inch (3.8 cm) LPD, 1 pass

|  | UV A (320-390 nm) | UV B (280-320 nm) | UV C (250-260 nm) | UV V (395-445 nm) |
|---|---|---|---|---|
| Irradiance (mW/cm$^2$) | 3730 | 1136 | 67 | 2319 |
| Dosage (mJ/cm$^2$) | 3835 | 1161 | 65 | 2352 |

After UV curing, the coatings are tack-free and fairly scratch resistant. However, full mechanical properties (hardness) and adhesion performance are developed 1 to 2 weeks after UV curing, due to the secondary moisture curing of the coating from the alkoxy groups of the grafted amino silanes.

Quick-Knife Adhesion

The Quick Knife Adhesion (QKA) test is used to assess the adhesion of glass bonding adhesives (Adhesives 1 to 3) to the UV cured coatings. The adhesives are applied directly to the coatings (without any primers) seven days after UV curing. After application, the adhesives are allowed to cure for 7 days at ~70° F. (21° C.) and 40-60 percent relative humidity (RH). The samples are thereafter exposed to additional environmental conditions as described hereinafter. The resulting bonding system is then tested via QKA, to assess the initial dry adhesion between the adhesives and the coatings. QKA is run according to SAE J1720 method. A 6.3 mm (width)×6.3 mm (height)×100 mm (length) size sealant bead is placed on the tested substrate and the assembly is cured as described above. In the QKA test, the adhesive/coating interface is scored with a sharp knife (cutting through the adhesive and coating, down to the glass substrate) as the adhesive is being pulled back. The cured bead is cut with a razor blade through to the tested substrate at a 45 degree angle while pulling back the end of the bead at 180 degree angle. Notches are cut every 3 mm on the painted surface. The results are reported as the percent of cohesive failure (failure within the urethane adhesive), with the desired result being 100 percent CF (cohesive failure). The alternative failure modes are adhesive failure (AF), which is failure of the bond of the adhesive to the surface of the coating, or "primer" failure (PF), which is removal of the coating from the glass when the adhesive is pulled back.

EXAMPLE 1

Coating formulations of the invention are made as described hereinafter.

Preparation of the Carbon Black Dispersion

The components of the carbon black dispersion are contained in Table 2.

TABLE 2

Carbon Black Dispersion

| Component | Grams | Weight % |
|---|---|---|
| Propoxylated neopentyl glycol diacrylate | 20.68 | 47 |
| Dispersant | 1.32 | 3 |
| Carbon Black | 22 | 50 |
| Total | 44 | 100 |

The carbon black is dried at 200° C. for 3 days or until the water content is less than 500 ppm, prior to use in the dispersions. The propoxylated neopentyl glycol diacrylate and dispersant are added to a Max 60 cup and speed mixed at 2,500 RPM for 3 minutes to insure that the dispersant is fully dissolved. Half of the carbon black is added (11 g) and the mixture is speed mixed at 2,000 RPM for 3 minutes. The second half of the carbon black is added and the mixture is speed mixed at 2,000 RPM for 5 minutes. The mixture is transferred to an 8 ounce (237 ml) NALGENE bottle. 60 grams of milling media is added and the mixture is ball milled for at least 4 days. The mixture is ball milled until minimal grit is present in a drawdown or until the Hegman Grind is 8, that is the particles are less than 10 microns.

Preparation of the Alumina Dispersion

The components of the Alumina dispersion are shown in Table 3

TABLE 3

Alumina Dispersion Contents

| Component | Grams | Weight % |
|---|---|---|
| Propoxylated neopentyl glycol diacrylate | 13.5808 | 21.22 |
| Dispersant | 0.4992 | 0.78 |
| Alumina | 49.92 | 78 |
| Total | 64 | 100 |

The alumina is dried at 200° C. for 4 days prior to use in the dispersions. The propoxylated neopentyl glycol diacrylate and dispersant are added to a Max 60 cup and speed mixed at 2,500 RPM for 3 minutes to insure that the dispersant is fully dissolved. The alumina is added and the mixture is speed mixed at 2,500 RPM for 5 minutes. The mixture is transferred to an 8 ounce (237 ml) NALGENE bottle. 100 grams of milling media is added and the mixture is ball milled for at least 4 days. The mixture is ball milled until minimal grit is present in a drawdown or until the Hegman Grind is 8, that is the particles are less than 10 microns.

Preparation of the Polyethylene Wax Dispersion

The components of the polyethylene wax dispersion are shown in Table 4.

TABLE 4

Polyethylene Wax Dispersion Contents

| Component | Grams | Weight % |
|---|---|---|
| Isobornyl acrylate | 4 | 50 |
| Polyethylene wax powder | 4 | 50 |
| Total | 8 | 100 |

Preparation of Adduct

The components of the adduct are shown in Table 5.

TABLE 5

Adduct Components

| Component | Grams | Weight % |
|---|---|---|
| Propoxylated neopentyl glycol diacrylate | 4.9262 | 43.5 |
| Bis(triethoxysilyl) propyl amine | 6.3858 | 56.5 |
| Total | 11.312 | 100 |

The components are mixed in a 1:1 mole ratio and mixed in a vortex mixer for 1 minute at Level 10 mixing speed. Thereafter the mixture is placed in an oven at 55° C. for 72 hours.

Preparation of Coating

The components of the coating are shown in Table 6.

TABLE 6

Coating Components

| Component | Grams | Weight % |
|---|---|---|
| Carbon black dispersion | 3.9500 | 7.9 |
| Alumina dispersion | 18.9000 | 37.8 |
| Vinyl trimethoxy silane | 0.5000 | 1 |
| Phenothiazine inhibitor | 0.0500 | 0.1 |
| 2,4,6-trimethylbenzyldiphenyl-phosphineoxide/benzophenone photoinitiator blend | 2.5000 | 5 |
| Benzophenone photoinitiator blend | 1.5000 | 3 |
| Siloxane acrylate wetting agent | 0.1000 | 0.2 |
| Polydimethylsiloxane defoamer | 0.2500 | 0.5 |
| Polyethylene wax dispersion | 2.5000 | 5 |
| Propoxylated glyceryl triacrylate | 2.5000 | 5 |
| Aliphatic urethane diacrylate | 7.5000 | 15 |
| Adduct | 7.5000 | 15 |
| Acrylic acid | 2.2500 | 4.5 |
| Total | 50.0000 | 100 |

The carbon black and alumina dispersions, the vinyl trimethoxy silane, phenothiazine inhibitor, 2,4,6-trimethylbenzyl-diphenyl-phosphine oxide photoinitiator blend, benzophenone photoinitiator blend are added to a Max 60 cup and speed mixed for 5 minutes at 3,000 RPM. The siloxane acrylate wetting agent, polydimethylsiloxane defoamer and polyethylene wax dispersion are added and the mixture is speed mixed for 5 minutes at 3,000 RPM. The propoxylated glyceryl triacrylate and aliphatic urethane diacrylate are added and the mixture is speed-mixed twice at 3,000 RPM. The mixture is mixed for a sufficient time to insure that the aliphatic urethane diacrylate is completely mixed in. The adduct is added and the mixture is speed-mixed for 5 minutes at 3,000 RPM. Then acrylic acid is added and the mixture is speed-mixed for 5 minutes at 3,000 RPM.

EXAMPLES 2 to 19

Use of Active Hydrogen Containing Siloxanes

For Examples 2 to 10 and 13 to 19, Example 1 is repeated except that the active hydrogen containing siloxanes listed below are used at the level of 0.7 wt. percent and replace 0.5 percent of the siloxane acrylate wetting agent and 0.2 percent of polydimethylsiloxane defoamer. In Examples 11 to 19, Example 1 is repeated with SILMER™ ACR Di-10 Linear difunctional acrylate terminated silicone pre-polymer in a concentration of 0.5 percent by weight. The samples are prepared according to the QKA test described hereinbefore and tested with Adhesives 1 to 3 on a float glass substrate. Samples are immersed in boiling water for either 24, 48 or 72 hours. The active hydrogen containing siloxanes tested are:

SILAMINE™ AS Aminoethylaminopropyl silicone solubilized with polyether groups in Example 2;

SILAMINE™ D10-D Hydrophobic tertiary silicone amine in Examples 3 and 18;

SILMER™ OH J10 hydroxyl functional silicone in Example 4;

SILUBE™ CS-1 Succinic-based carboxylate silicone in free acid form in Examples 5 and 16;

SILMER™ H Di E2 Linear difunctional and multi-functional silicone hydride prepolymer in Example 6;

DC-2737™ Linear difunctional silanol terminated silicone pre-polymer in Example 7;

SILMER™ NCO Di-10 Linear difunctional isocyanate terminated silicone pre-polymer in Example 8;

SILPHOS™ A-100 silicone polyether phosphate ester in free acid form (phosphonic acid) in Examples 9 and 17;

SILMER™ ACR Di-10 Linear difunctional acrylate terminated silicone pre-polymer in Examples 10 and 13;

SILMER™ ACR D2 acrylated siloxane with hydroxyl groups in Example 14;
SILMER™ EP Di10 Linear epoxy functional siloxane in Example 15; and
SILUBE™ CP-1 carboxylic acid functional siloxane in Example 19.

The results of the quick knife adhesive testing are compiled in Table 7 for Examples 2 to 10 and Table 8 for Examples 11 to 19. For entries not totaling 100, the remainder is adhesive failure.

TABLE 7

| Example | Adhesive | Boiling Water Exposure 24 Hours | Boiling Water Exposure 48 Hours | Boiling Water Exposure 72 Hours |
|---|---|---|---|---|
| 1 | 1 | 40PF, 60CF | 20PF, 10AF, 70CF | 40CF |
| 2 | 1 | 25PF, 75PF | 95CF | 75CF |
| 3 | 1 | 100CF | 90CF | 40CF |
| 4 | 1 | 10PF, 90CF | 90CF | 70CF |
| 5 | 1 | 40PF, 60CF | 85CF | 70CF |
| 6 | 1 | 20PF, 80CF | 60CF | 20CF |
| 7 | 1 | 100CF | 85CF | 70CF |
| 8 | 1 | 15PF, 85CF | 85CF | 40CF |
| 9 | 1 | 10PF, 90CF | 80CF | 60CF |
| 10 | 1 | 90CF | 70CF | 5CF |
| 1 | 2 | 60CF | 50CF | 50CF |
| 2 | 2 | 100CF | 100CF | 100CF |
| 3 | 2 | 100CF | 100CF | 85CF |
| 4 | 2 | 100CF | 100CF | 100CF |
| 5 | 2 | 100CF | 100CF | 95CF |
| 6 | 2 | 100CF | 100CF | 90CF |
| 7 | 2 | 100CF | 100CF | 95CF |
| 8 | 2 | 90CF | 100CF | 80CF |
| 9 | 2 | 100CF | 100CF | 95CF |
| 10 | 2 | 100CF | 100CF | 90CF |
| 1 | 3 | 60CF | 30CF | 5CF |
| 2 | 3 | 100CF | 45CF | 20CF |
| 3 | 3 | 90CF | 80CF | 15CF |
| 4 | 3 | 95CF | 50CF | 15CF |
| 5 | 3 | 95CF | 80CF | 50CF |
| 6 | 3 | 80CF | 75CF | 69CF |
| 7 | 3 | 30CF | 70CF | 25CF |
| 8 | 3 | 75CF | 20CF | 20CF |
| 9 | 3 | 100CF | 85CF | 80CF |
| 10 | 3 | 90CF | 80CF | 75CF |

TABLE 8

| Example | Adhesive | Boiling Water Exposure 24 Hours | Boiling Water Exposure 48 Hours | Boiling Water Exposure 72 Hours |
|---|---|---|---|---|
| 11 | 4 | 5PF, 15AF, 80CF | 40CF | 10CF |
| 12 | 4 | 100CF | 70CF | 30CF |
| 13 | 4 | 100CF | 75CF | 50CF |
| 14 | 4 | 100CF | 90CF | 30CF |
| 15 | 4 | 95CF | 60CF | 5CF |
| 16 | 4 | 75PF, 25CF | 85CF | 40CF |
| 17 | 4 | 10PF, 90CF | 85CF | 60CF |
| 18 | 4 | 50PF, 50CF | 85CF | 50CF |
| 19 | 4 | 5PF, 95CF | 90CF | 30CF |
| 11 | 5 | 95CF | 50CF | 20CF |
| 12 | 5 | 95CF | 75CF | 30CF |
| 13 | 5 | 100CF | 75CF | 25CF |
| 14 | 5 | 100CF | 70CF | 45CF |
| 15 | 5 | 85CF | 50CF | 30CF |
| 16 | 5 | 20PF, 80CF | 85CF | 50CF |
| 17 | 5 | 10PF, 90CF | 85CF | 60CF |
| 18 | 5 | 50PF, 50CF | 85CF | 50CF |
| 19 | 5 | 5PF, 95CF | 90CF | 30CF |
| 11 | 6 | 20CF | 15CF | 10CF |
| 12 | 6 | 65CF | 40CF | 50CF |
| 13 | 6 | 90CF | 75CF | 80CF |

TABLE 8-continued

| Example | Adhesive | Boiling Water Exposure 24 Hours | Boiling Water Exposure 48 Hours | Boiling Water Exposure 72 Hours |
|---|---|---|---|---|
| 14 | 6 | 95CF | 90CF | 75CF |
| 15 | 6 | 90CF | 70CF | 50CF |
| 16 | 6 | 25CF | 25CF | 25CF |
| 17 | 6 | 50CF | 45CF | 40CF |

EXAMPLES 20 to 30

Use of Varied Acrylates in Adducts

Examples 20 to 30 demonstrate the use of a variety of acrylates for the adducts added to the coatings of the invention. Several adducts are prepared by contacting various acrylates with bis-[3-(triethoxysilyl)propyl] amine (MW 425.72) in an equimolar ratio and heating the mixture for 3 days at 55° C. The acrylate monomers used along with their molecular weight and acrylate functionality are listed in Table 9. The coatings are prepared as described in Example 1 except SILMER™ ACR Di-10 Linear difunctional acrylate terminated silicone pre-polymer in a concentration of 0.5 percent by weight is added and SILMER™ ACR D2 acrylate functional siloxane with hydroxyl groups is used at the level of 0.7 weight percent and replace 0.5 percent of the siloxane acrylate wetting agent and 0.2 weight percent of polydimethylsiloxane defoamer. The samples are prepared according to the QKA test described hereinbefore with three different adhesive formulations, Adhesives 4 to 6, on a float glass substrate. Samples are immersed in boiling water for 24, 48 and 72 hours. The universal hardness of each coating is determined according to a FISCHERSCOPE H100C (Fischer Technology) computer-controlled, ultra-low load dynamic micro indentation system, in conjunction with WIN-HCU (Fischer Technology) control software. The results of the quick knife adhesive testing are compiled in Table 10. For entries not totaling 100 the remainder is adhesive failure.

TABLE 9

| Example | Acrylate Monomer | MW | Acrylate Functionality |
|---|---|---|---|
| 20 | Propoxylated neopentyl glycol diacrylate | 328.41 | 2 |
| 21 | Trimethylolpropane triacrylate | 296.32 | 3 |
| 22 | Ethoxylated trimethylolpropane triacrylate | 428 | 3 |
| 23 | Propoxylated glyceryl triacrylate | 428 | 3 |
| 24 | Tris(2-hydroxyethyl)isocyanurate triacrylate | 423.37 | 3 |
| 25 | Pentaerythritol triacrylate | 298 | 3 |
| 26 | Pentaerythritol tetra-acrylate | 352 | 4 |
| 27 | Ditrimethylolpropane tetra-acrylate | 482 | 4 |
| 28 | Tricyclodecanedimethanol diacrylate | 304 | 2 |
| 29 | Cyclohexanedimethanol diacrylate | 252.31 | 2 |
| 30 | 1,3-butylene glycol diacrylate | 198.22 | 2 |

TABLE 10

| Example | Adhesive | Boiling Water Exposure 24 Hours | Boiling Water Exposure 48 Hours | Boiling Water Exposure 72 Hours | Hardness |
|---|---|---|---|---|---|
| 20 | 4 | 5PF, 95CF | 90CF | 75CF | 155 |
| 21 | 4 | 60PF, 40CF | 90CF | 70CF | 180 |
| 22 | 4 | 80PF, 20CF | 90CF | 80CF | 175 |
| 23 | 4 | 50PF, 50CF | 15PF, 85CF | 70CF | 177 |
| 24 | 4 | 95PF, 5CF | 75CF | 70CF | 181 |
| 25 | 4 | 95PF, 5CF | 30PF, 60CF | 80CF | 190 |
| 26 | 4 | 100PF | 5PF, 95CF | 65CF | 166 |
| 27 | 4 | 95CF | 80CF | 20CF | 178 |
| 28 | 4 | 100CF | 85CF | 75CF | 193 |
| 29 | 4 | 100CF | 95CF | 85CF | 173 |
| 30 | 4 | 25PF, 75CF | 100CF | 80CF | 183 |
| 20 | 5 | 100CF | 95CF | 90CF | |
| 21 | 5 | 40PF, 60CF | 90CF | 80CF | |
| 22 | 5 | 60PF, 40CF | 95CF | 90CF | |
| 23 | 5 | 30PF, 60CF | 95CF | 90CF | |
| 24 | 5 | 95PF, 5CF | 5CF | 40CF | |
| 25 | 5 | 100PF | 100PF | 25CF | |
| 26 | 5 | 100PF | 0CF | 15CF | |
| 27 | 5 | 100CF | 100CF | 80CF | |
| 28 | 5 | 100CF | 100CF | 90CF | |
| 29 | 5 | 100CF | 100CF | 95CF | |
| 30 | 5 | 10PF, 90CF | 100CF | 85CF | |
| 20 | 6 | 80CF | 50CF | 70CF | |
| 21 | 6 | 75CF | 65CF | 100CF | |
| 22 | 6 | 15PF, 70CF | 75CF | 65CF | |
| 23 | 6 | 10PF, 90CF | 100CF | 100CF | |
| 24 | 6 | 60PF, 40CF | 100CF | 100CF | |
| 25 | 6 | 60PF, 40CF | 95CF | 100CF | |
| 26 | 6 | 80PF, 20CF | 95CF | 100CF | |
| 27 | 6 | 95CF | 95CF | 95CF | |
| 28 | 6 | 95CF | 65CF | 65CF | |
| 29 | 6 | 95CF | 80CF | 85CF | |
| 30 | 6 | 85CF | 80CF | 80CF | |

EXAMPLES 31 to 33

Use of Film Forming Resins with Acrylate and Hydroxyl Functionality

Examples 31 to 33 are performed in the same manner as Example 1 except the formulation uses 4 percent of the 50 percent carbon black formulation and Examples 32 and 33 utilize 5 wt. % of CN™ UVE 151 epoxy acrylate oligomer having secondary hydroxyls from Sartomer and UA 00-022 Urethane Acrylate oligomer containing hydroxyl functional groups respectively (in conjunction with CN™ 983 aliphatic urethane diacrylate oligomer present in coating formulation). QKA samples are prepared as described in previous examples except the coating thickness is 20 to 25 microns instead of the 10 to 14 microns utilized in the other examples. The samples are prepared utilizing Adhesives 1 to 3 as described hereinbefore. The results are compiled in Table 11.

TABLE 11

| Example | Adhesive | Boiling Water Exposure 24 Hours | Boiling Water Exposure 48 Hours | Boiling Water Exposure 72 Hours |
|---|---|---|---|---|
| 31 | 1 | 100CF | 85CF | 20CF |
| 32 | 1 | 20PF, 80CF | 95CF | 30CF |
| 33 | 1 | 25PF, 75CF | 100 CF | 75CF |
| 31 | 2 | 90CF | 60CF | 20CF |
| 32 | 2 | 100CF | 80CF | 30CF |
| 33 | 2 | 100CF | 85CF | 60CF |
| 31 | 3 | 75CF | 40CF | 5CF |
| 32 | 3 | 85CF | 60CF | 25CF |
| 33 | 3 | 85CF | 50CF | 30CF |

EXAMPLES 34 to 37

Coatings with Varied Polyethylene Wax Concentrations

Example 1 is repeated except the polyethylene wax concentration is varied. In Example 34 no wax is utilized. In Examples 35 to 37, the amount of polyethylene wax is 2.5, 5.0 and 10.0 percent respectively. The adhesion of the coatings are tested to Adhesives 1 to 3 using the QKA test as described hereinbefore. The results are compiled in Table 12.

TABLE 12

| Example | Adhesive | Percent Wax | Boiling Water Exposure 24 Hours | Boiling Water Exposure 48 Hours | Boiling Water Exposure 72 Hours |
|---|---|---|---|---|---|
| 34 | 1 | 0 | 60PF, 40CF | 85CF | 60CF |
| 35 | 1 | 2.5 | 10PF, 90CF | 95CF | 60CF |
| 36 | 1 | 5 | 10PF, 90CF | 80CF | 50CF |
| 37 | 1 | 10 | 100CF | 85CF | 50CF |
| 34 | 2 | 0 | 10CF | 95CF | 90CF |
| 35 | 2 | 2.5 | 100CF | 100CF | 90CF |
| 36 | 2 | 5 | 100CF | 100CF | 80CF |
| 37 | 2 | 10 | 100CF | 100CF | 85CF |
| 34 | 3 | 0 | 0CF | 25CF | 30CF |
| 35 | 3 | 2.5 | 60CF | 60CF | 60CF |
| 36 | 3 | 5 | 75CF | 70CF | 60CF |
| 37 | 3 | 10 | 90CF | 70CF | 70CF |

EXAMPLES 38 to 41

Use of Secondary Adhesion Promoters

In Examples 39 to 41, different secondary adhesion promoters are used in comparison to Example 38 which utilizes the coating of Example 1. In Example 39, the secondary adhesion promoter is 5 percent of Z-6106 blend of a melamine resin and an epoxy silane (gamma-glycidyloxypropyl trimethoxysilane) available from Dow Corning Corporation. In Example 40 the secondary adhesion promoter is CYMEL™ 303LF melamine resin present in a concentration of 5 percent by weight. In Example 41, the secondary adhesion promoter is SILQUEST™ A-187 gamma-glycidyloxypropyl trimethoxysilane utilized in a concentration of 5 percent by weight. The adhesion of adhesives 4 to 6 to coatings of Examples 38 to 41 are tested according to the QKA test. The results are compiled in Table 13.

TABLE 13

| Example | Adhesive | Boiling Water Exposure 24 Hours | Boiling Water Exposure 48 Hours | Boiling Water Exposure 72 Hours |
|---|---|---|---|---|
| 38 | 4 | 60PF, 40CF | 70CF | 10CF |
| 39 | 4 | 85CF | 50CF | 5CF |
| 40 | 4 | 100CF | 50 CF | 5CF |
| 41 | 4 | 90CF | 25CF | 0CF |
| 38 | 5 | 70CF | 75CF | 30CF |
| 39 | 5 | 100CF | 80CF | 60CF |
| 40 | 5 | 100CF | 85CF | 60CF |
| 41 | 5 | 100CF | 60CF | 60CF |
| 38 | 6 | 5CF | 10CF | 0CF |
| 39 | 6 | 30CF | 10CF | 5CF |
| 40 | 6 | 40CF | 5CF | 5CF |
| 41 | 6 | 30CF | 10CF | 10CF |

EXAMPLES 42 to 47

Modified Adhesives

Examples 42 to 47, respectively, illustrate the adhesion of Adhesives 4 to 6 and Adhesives 4 to 6 modified with 1 percent by weight of Silquest A-187 gamma-glycidyloxypropyl trimethoxysilane and 1 percent by weight of heat and UV stabilizers to the coating of Example 1. QKA testing is performed as described above. The results are compiled in Table 14.

TABLE 14

| Example | Adhesive | Boiling Water Exposure 24 Hours | Boiling Water Exposure 48 Hours | Boiling Water Exposure 72 Hours |
|---|---|---|---|---|
| 42 | 4 | 60PF, 40CF | 30CF | 5CF |
| 43 | 5 | 15PF, 85CF | 50CF | 15CF |
| 44 | 6 | 15CF | 5 CF | 0CF |
| 45 | 4 Modified | 95CF | 50CF | 0CF |
| 46 | 5 Modified | 60CF | 75CF | 10CF |
| 47 | 6 Modified | 95CF | 20CF | 0CF |

EXAMPLES 48 to 50

Adhesion of Coatings to Isocyanate and Siloxane Functional Adhesives

Example 1 is repeated with modifications to the coating and then tested for adhesion to Adhesives 4 to 7. Adhesive 7 is a siloxy functional adhesive. In Examples 48 to 50, the coatings of Example 1 is modified by adding 0.5 percent by weight of SILMER™ ACR Di-10 Linear difunctional acrylate terminated silicone pre-polymer and 0.3 percent by weight of SILMER™ ACR D-2 multifunctional acrylate terminated silicone prepolymer. In Example 49 the coating is also modified to add 5 percent of Z-6106™ blend of a melamine resin and an epoxy silane (gamma-glycidyloxypropyl trimethoxysilane) available from Dow Corning Corporation. In Example 50, 1 percent by weight of BDE™ 1025 dendritic polyester acrylate with hydroxyl groups from Bomar is added. A sample of each liquid coating formulation is placed in an oven at 54° C. for three days and the samples do not gel. After applying the coating and the adhesive as described hereinbefore, the samples are placed in a 90° C. water bath for a varied number of days and adhesion is tested according to the quick knife adhesion test. The results of the QKA tests are compiled in Table 15.

TABLE 15

| Days in Water Bath | Adhesive | Example 48 | Example 49 | Example 50 |
|---|---|---|---|---|
| Initial - 0 | 7 | 100CF | 100CF | 100CF |
| 1 | 7 | 100CF | 100CF | 100CF |
| 2 | 7 | 100CF | 100CF | 100CF |
| 3 | 7 | 100CF | 100CF (smear) | 100CF |
| 4 | 7 | 100CF | 100CF (smear) | 100CF |
| 5 | 7 | 100CF | 0CF | 100CF |
| Initial - 0 | 4 | 100CF | 100CF | 100CF |
| 1 | 4 | 90CF, 10PF | 100CF | 40CF, 60PF |
| 2 | 4 | 10CF, 90PF | 100CF | 70CF, 30PF |
| 3 | 4 | 80CF, 20PF | 100CF | 80CF, 20PF |
| 4 | 4 | 100CF | 100CF | 100CF |
| 5 | 4 | 80CF, 20AF | 80CF, 20AF | 60CF, 40AF |
| Initial - 0 | 5 | 100CF | 100CF | 100CF |
| 1 | 5 | 100CF | 100CF | 90CF, 10PF |
| 2 | 5 | 100CF | 100CF | 100CF |
| 3 | 5 | 100CF | 100CF | 100CF |
| 4 | 5 | 100CF | 100CF | 100CF |
| 5 | 5 | 100CF | 100CF | 100CF |
| Initial - 0 | 6 | 100CF | 100CF | 100CF |
| 1 | 6 | 10CF, 90AF | 95CF, 5AF | 30CF, 70AF |
| 2 | 6 | 10CF, 90AF | 90CF, 10AF | 30CF, 70AF |
| 3 | 6 | 0CF | 0CF | 0CF |
| 4 | 6 | 0CF | 0CF | 0CF |
| 5 | 6 | 10CF, 90AF | 20CF, 80AF | 30CF, 70AF |

EXAMPLES 51 to 55

Example 1 is repeated with modifications to the coating as described in Table 16 and then tested for adhesion to Adhesives 4 to 6. Quick Knife adhesion is tested after one week at 23° C. and 50 percent relative humidity and after 2 weeks at 38° C. and 100 percent relative humidity. Further lap shear samples are prepared and exposed to Weatherometer conditions according to SAE J1885 for 2,000 hours. The results are compiled in Table 17.

TABLE 16

| Ingredients | Example 51 Percent | 52 Percent | 53 Percent | 54 Percent | 55 Percent |
|---|---|---|---|---|---|
| Carbon black dispersion | 7.95 | 7.95 | 7.95 | 7.95 | 7.95 |
| Alumina oxide dispersion | 35.75 | 25.41 | 22.48 | 25.41 | 16.67 |
| Polyethylene wax powder | 2.50 | 1.78 | 1.57 | 1.78 | 1.17 |
| Vinyl trimethoxy silane | 1.00 | 0.71 | 0.63 | 0.71 | 0.47 |
| Isobornyl acrylate | 2.22 | 1.58 | 1.40 | 1.57 | 1.04 |
| Propoxylated glyceryl triacrylate | 4.45 | 3.16 | 2.80 | 3.17 | 2.07 |
| phenothiazine free radical polymerization inhibitor | 0.09 | 0.07 | 0.06 | 0.06 | 0.04 |
| bis(1-octyloxy-2,2,6-tetramethyl-4-piperidyl)sebacate | 1 | 0.71 | 0.63 | 0.71 | 0.47 |
| a mixture of (2,4-dimethylphenyl)-1,3,5-triazines | 1 | 0.71 | 0.63 | 0.71 | 0.47 |
| alpha-amino ketone free radical polymerization photoinitiator (fine powder) | 5.00 | 5.00 | 5.00 | 5.00 | 5.00 |
| Adduct | 15.00 | 15.0 | 15.0 | 10.0 | 10.0 |
| blend of melamine resin and (gamma-glycidyloxypropyl trimethoxysilane) | 5 | 25.0 | 10.0 | 10.0 | 25.0 |
| Acrylic Acid | 4.5 | 2.3 | 2.3 | 2.3 | 2.3 |

TABLE 16-continued

|  | Example | | | | |
| --- | --- | --- | --- | --- | --- |
| Ingredients | 51 Percent | 52 Percent | 53 Percent | 54 Percent | 55 Percent |
| Aliphatic urethane diacrylate oligomer | 13.34 | 9.48 | 28.4 | 29.5 | 26.2 |
| acrylate functional siloxane with hydroxyl groups | 0.50 | 0.50 | 0.50 | 0.50 | 0.50 |
| Linear difunctional acrylate terminated silicone pre-polymer | 0.70 | 0.70 | 0.70 | 0.70 | 0.70 |
| Total | 100.00 | 100.00 | 100.00 | 100.00 | 100.00 |

TABLE 17

| Exposure Conditions | | | | | |
| --- | --- | --- | --- | --- | --- |
| 1 week @23 C./50% RH | | | | | |
| Adhesive 4 | 100CF | 100CF | 100CF | 100CF | 70CF, 30CFC |
| Adhesive 5 | 100CF | 100CF | 100CF | 100CF | 100CF |
| Adhesive 6 | 100CF | 100CF | 100CF | 100CF | 100CF |
| 2 weeks @38 C./100% RH | | | | | |
| Adhesive 4 | 100CF | 100CF | 100CF | 100CF | 100CF |
| Adhesive 5 | 100CF | 100CF | 100CF | 100CF | 100CF |
| Adhesive 6 | 100CF | 100CF | 100CF | 100CF | 100CF |
| 2000 hrs Weatherometer with Adhesive 4 | | | | | |
| 1 | 256/0CF | 118/0CF | 717/90CF, 10AF | 489/100CF | 493/100CF |
| 2 | 180/0CF | 113/0CF | 726/100CF | 442/100CF | 445/100CF |
| 3 | 244/0CF | 173/0CF | 732/100CF | 384/80CF, 10AF | 468/100CF |
| ave | 226 | 135 | 725 | 438 | 469 |
| stdev | 41 | 33 | 8 | 53 | 24 |
| 2000 hrs Weatherometer with Adhesive 5 | | | | | |
| 1 | 468/100CF | 608/100CF | 564/100CF | 914/100CF | 588/100CF |
| 2 | 335/0CF | 604/100CF | 544/100CF | 676/100CF | 544/100CF |
| 3 | 606/100CF | 575/100CF | 492/100CF | 741/100CF | 530/0CF |
| ave | 470 | 596 | 534 | 777 | 553 |
| stdev | 136 | 18 | 38 | 123 | 30 |
| 5. 2000 hrs Weatherometer with Adhesive 6 | | | | | |
| 1 | 206/0CF | 505/100CF | 531/100CF | 761/100CF | 366/100CF |
| 2 | 139/0CF | 534/100CF | 670/100CF | 596/100CF | 377/100CF |
| 3 | 248/0CF | 430/100CF | 468/100CF | 608/100CF | 492/100CF |
| ave | 198 | 490 | 556 | 655 | 411 |
| stdev | 55 | 162 | 24 | 92 | 70 |

EXAMPLES 56 to 64

In Examples 56 to 64, the coatings are prepared as described hereinafter. The carbon black and alumina dispersions, the vinyl trimethoxy silane, phenothiazine inhibitor, benzophenone photoinitiator blend and propoxylated glyceryl triacrylate are added to a Max 100 cup and speed mixed for 5 minutes at 3,000 RPM. IRGACURE™ 819 phosphine oxide photoinitiator and IRGACURE™ 2100 liquid phosphine oxide photoinitiator are added and the mixture is speed mixed twice each for 5 minutes at 3,000 rpm to fully mix the phosphine oxide photoinitiator in the mixture. The siloxane acrylate wetting agent and polyethylene wax dispersion are added and the mixture is speed mixed for 5 minutes at 3,000 RPM. The acrylic acid and aliphatic urethane diacrylate are added and the mixture is speed-mixed twice at 3,000 RPM. The mixture is mixed for a sufficient time to insure that the aliphatic urethane diacrylate is completely mixed in. The mixture is then split into Max 20 cups and a melamine is added and the mixture is speed-mixed for 5 minutes at 3,000 RPM. There after the adduct is added and the mixture is speed mixed for 5 minutes at 3000 RPM. The ratio of previously prepared mixture to the melamine resin to the adduct is 6.75:0.9:1.35. Table 18 lists the amounts of the ingredients.

TABLE 18

| Ingredients | Example Percent |
|---|---|
| Carbon black dispersion | 3.5 |
| Alumina oxide dispersion | 37.0 |
| Polyethylene wax powder | 2.750 |
| Vinyl trimethoxy silane | 1.00 |
| Isobornyl acrylate | 0 |
| Propoxylated glyceryl triacrylate | 5.5 |
| phenothiazine free radical polymerization inhibitor | 0.11 |
| Benzophenone photoinitiator | 3.3 |
| Phosphine oxide photoinitiator | 1.54 |
| Liquid phosphine oxide photoinitiator | 5.00 |
|  | 15.00 |
|  | 5 |
| Acrylic Acid | 4.95 |
| Aliphatic urethane diacrylate oligomer | 16.5 |
| acrylate functional siloxane with hydroxyl groups | 0.50 |
| Linear difunctional acrylate terminated silicone pre-polymer | 0.55 |
|  | 100.00 |

Table 19 lists the examples and the melamine resin used in each example.

TABLE 19

| Example | Melamine resin |
|---|---|
| 56 | CYMEL ™ 300 methylated melamine-formaldehyde resin |
| 57 | CYMEL ™ 303 ULF melamine resin |
| 58 | CYMEL ™ 327 high imino melamine-formaldehyde resin |
| 59 | CYMEL ™ 370 partially alkylated melamine-formaldehyde resins |
| 60 | CYMEL ™ 1135 methylated/n-butylated melamine-formaldehyde resin |
| 61 | CYMEL ™ 1168 methylated/n-butylated melamine-formaldehyde resin |
| 62 | CYMEL ™ 1170 fully butylated glycoluril formaldehyde resin |
| 63 | Z-6106 blend of a melamine resin and gamma-glycidyloxypropyl trimethoxysilane |
| 64 | No Melamine |

The coatings are applied to float glass and cured as described hereinbefore. Quick Knife Adhesive samples are prepared using Adhesive 6 and exposed to boiling water for 1, 2 and 3 days. The Quick Knife Adhesive test is then performed on each sample. The results are compiled in Table 20. The results show the presence of a melamine resin gives improved adhesion over a coating containing no melamine resin after 24 hours in boiling water.

TABLE 20

| Days | 56 | 57 | 58 | 59 | 60 | 61 | 62 | 63 | 64 |
|---|---|---|---|---|---|---|---|---|---|
| 1 | 60CF | 80CF | 40CF | 60CF | 50CF | 55CF | 15CF | 75CF | 15CF |
| 2 | 15CF | 10CF | 15CF | 20CF | 10CF | 10CF | 15CF | 15CF | 10CF |
| 3 | 5CF | 5CF | 0CF | 0CF | 0CF | 5CF | 5CF | 5CF | 0CF |

EXAMPLES 65 to 74

Examples 65 to 74 are prepared as described relative to Examples 56 to 64 using the ingredients as described in Table 21. The ratio of the primary mixture to melamine to adduct is 8.36:1.00:1.50. The examples use a variety of melamines as listed in Table 22. The compositions are coated on float glass and cured as described hereinbefore. Quick Knife Adhesion samples are prepared for all examples using Adhesive 6 and for examples 72, 73 and 74 using Adhesive 4. The samples are exposed to varying amounts of time in boiling water, 1 to 3 days, and the Quick Knife adhesion tests are performed. Coatings of for each example are also tested for hardness according to the Micro-indentation Hardness Test described hereinafter. To assess the hardness of the coatings on glass, a FISCHERSCOPE® H100C (Fischer Technology) computer-controlled, ultra-low load dynamic micro indentation system is used, in conjunction with WIN-HCU® (Fischer Technology) control software. In this test, a Vickers indenter in the form of a straight diamond pyramid with square base and opposite sides angled at 136° was pressed into the surface of the coating with an applied force of 5 mN (rate=5 mN/20 seconds). The maximum load is then held for 20 seconds (creep step) followed by the releasing of the load (rate=5 mN/20 seconds). A final creep step of 20 seconds completes the test cycle. By taking into account the geometry of the indenter and the penetration depth for the applied force, a Universal Hardness measurement, HU, is obtained. The results are compiled in Table 23. The results show that UV coatings containing a melamine containing compound exhibit improved adhesion after 1 day (24 hours) of exposure to boiling water when compared to coatings without the melamine. Acrylated melamine containing coatings demonstrate an increase in hardness over coatings which do not contain acrylate-containing melamines.

TABLE 21

| Component | Weight |
|---|---|
| Carbon black dispersion | 6 |
| Alumina dispersion | 37.8 |
| Vinyl trimethoxy silane | 1 |
| Phenothiazine inhibitor | 0.1 |
| 2,4,6-trimethylbenzyldiphenylphosphineoxide/benzophenone photoinitiator blend | 5 |
| Benzophenone photoinitiator blend | 3 |
| Linear difunctional acrylate terminated silicone pre-polymer | 0.5 |
| Acrylated siloxane with hydroxyl groups | 0.7 |
| Polyethylene wax dispersion | 5 |
| Propoxylated glyceryl triacrylate | 5 |
| Aliphatic urethane diacrylate | 15 |
| Acrylic acid | 4.5 |
| Total | 100 |

TABLE 22

| Example | Melamine |
|---|---|
| 65 | BMA ™ 200 melamine triacrylate oligomer |
| 66 | BMA ™ 220 melamine monoacrylate oligomer |
| 67 | BMA ™ 250 melamine triacrylate oligomer |
| 68 | BMA ™ 222 melamine triacrylate oligomer |
| 69 | BMA ™ 300 melamine triacrylate oligomer |
| 70 | BMM ™ 215 melamine trimethacrylate oligomer |
| 71 | BMA ™ 224 melamine pentaacrylate oligomer |
| 72 | CYMEL ™ 303 ULF melamine resin |
| 73 | Z-6106 |
| 74 | None |

TABLE 23

| Adhesive, | Days | 65 | 66 | 67 | 68 | 69 | 70 | 71 | 72 | 73 | 74 |
|---|---|---|---|---|---|---|---|---|---|---|---|
| 6, | 1 | 95CF | 85CF | 95CF | 95CF | 95CF | 100CF | 95CF | 85CF | 80CF | 75CF |
| 6, | 2 | 80CF | 20CF | 45CF | 70CF | 25CF | 85CF | 90CF | 55CF | 10CF | 45CF |
| 6, | 3 | 40CF | 5CF | 25CF | 25CF | 10CF | 20CF | 45CF | 20CF | 5CF | 30CF |
| 4, | 1 | | | | | | | | 95CF | 100CF | 20PF, 80CF |
| 4, | 2 | | | | | | | | 45CF | 70CF | 65CF |
| 4, | 3 | | | | | | | | 30CF | 30CF | 20CF |
| Hardness (N/mm$^2$) | | 228.7 | 154.5 | 183.2 | 232.5 | 179.2 | 214.3 | 203.3 | 128.4 | 139.8 | 214.1 |

EXAMPLES 75 to 79

In Examples 75 to 79, the coatings are prepared as described hereinafter. The carbon black, alumina dispersions and the vinyl trimethoxy silane are added to a Max 100 cup and speed mixed for 5 minutes at 3,000 RPM. The 2,4,6-trimethylbenzyl-diphenyl-phosphine oxide photoinitiator blend and benzophenone photoinitiator blend are added and the mixture is speed mixed for 5 minutes at 3,000 RPM. The polyethylene wax dispersion is added and the mixture is speed mixed for 5 minutes at 3,000 RPM. The acrylic acid, propoxylated glyceryl triacrylate and aliphatic urethane diacrylate are added and the mixture is speed-mixed twice at 3,000 RPM. The mixture is mixed for a sufficient time to insure that the aliphatic urethane diacrylate is completely mixed in. The mixture is then split into Max 20 cups (8.240 parts of the mixture) and for Examples 76 and 79, 0.7 parts of SILMER™ ACR D2 acrylated siloxane with hydroxyl groups and, for Examples 78 and 79, 0.5 parts of Polydimethylsiloxane defoamer are added. The mixture is speed-mixed for 5 minutes at 3,000 RPM. Thereafter, the adduct is added and the mixture is speed mixed for 5 minutes at 3,000 RPM. Table 24 lists the amounts of the ingredients. The coatings are coated unto float glass and cured as described hereinbefore. Quick knife adhesion tests are performed using adhesives 4 to 6. Samples are exposed to boiling water for 1 to 3 days and then tested using the Quick Knife Adhesion test. The results are compiled in Table 25. The surface energy of the coatings for Examples 77 and 79 are measured as 43.1 and 23.1 mN/m respectively. The quick-knife adhesion results for Examples 75 and 76 show that the UV cured coatings containing SILMER ACR D2 acrylated siloxane with hydroxyls exhibit improved adhesion to Adhesives 1 to 3 after boiling water immersion, compared to the coatings without any silicone additives. Examples 77 to 79 demonstrate that incorporation of a conventional silicone additive with no functional groups (78) in a UV cured coating results in decreased adhesion to Adhesives 4 to 6, compared to a coating without any silicone additives, (77). However, by incorporating SILMER™ ACR D2 acrylated siloxane in a coating that contains FOAM BLAST™ 30 conventional silicone additive (79), we see that the adhesion between the resulting UV coating and the adhesives improves significantly. In fact, the adhesion of Adhesives 4 and 6 to the coating with 0.5 percent of a conventional silicone additive and 0.7% acrylated siloxane demonstrates better adhesion to a coating without silicone additives. This demonstrates the benefits of incorporating acrylated siloxane with hydroxyls in coatings to enhance adhesion to adhesives.

TABLE 24

| Component | Weig |
|---|---|
| Carbon black dispersion | 6 |
| Alumina dispersion | 37.8 |
| Vinyl trimethoxy silane | 1 |
| Phenothiazine inhibitor | 0.1 |
| 2,4,6-trimethylbenzyldiphenylphosphineoxide/benzophenone photoinitiator blend | 5 |
| Benzophenone photoinitiator blend | 3 |
| Polyethylene wax dispersion | 5 |
| Propoxylated glyceryl triacrylate | 5 |
| Aliphatic urethane diacrylate | 15 |
| Acrylic acid | 4.5 |
| Total | 82.4 |

TABLE 25

| Adhesive | Days Exposure | 75 test 1 | 76 test 1 | 75 test 2 | 76 test 2 | 77 | 78 | 79 |
|---|---|---|---|---|---|---|---|---|
| 4 | 1 | 100CF | 100CF | 100CF | 100CF | 15PF 90CF | 10PF 90CF | 5PF 95CF |
| 4 | 2 | 75CF | 85CF | 65CF | 80CF | 70CF | 30CF | 70CF |
| 4 | 3 | 20CF | 50CF | 30CF | 45CF | 15CF | 0CF | 40CF |
| 5 | 1 | 100CF | 100CF | 100CF | 100CF | 100CF | 100CF | 100CF |
| 5 | 2 | 90CF | 100CF | 100CF | 100CF | 100CF | 95CF | 100CF |
| 5 | 3 | 90CF | 95CF | 95CF | 100CF | 90CF | 80CF | 85CF |
| 6 | 1 | 90CF | 100CF | 80CF | 100CF | 100CF | 40CF | 95CF |
| 6 | 2 | 25CF | 95CF | 20CF | 70CF | 45CF | 15CF | 70CF |
| 6 | 3 | 20CF | 75CF | 15CF | 20CF | 15CF | 10CF | 50CF |

What is claimed is:

1. A composition comprising:
   a) one or more film forming resins having at least one functional group capable of polymerization:
   b) one or more adhesion promoters comprising compounds containing one or more unsaturated groups capable of free radical polymerization and one or more trialkoxy silane groups:
   c) one or more fillers capable of imparting abrasion resistance to the composition when polymerized:
   d) one or more compounds which is reactive with the film forming resin which also contains at least one acidic moiety; and
   e) i) one or more compounds comprising a siloxane backbone and one or more active hydrogen groups capable of reacting with a functional group on a glass bonding adhesive; and, ii) A) one or more second adhesion promoters comprising one or more silicon, titanium, zirconium, aluminum, or metal containing compounds: ii) B) organic materials having reactive groups which contain one or more melamine units; or mixtures of ii) A) and ii) B).

2. A composition according to claim 1 wherein the reactive diluent is one or more polyacrylates having a molecular weight of 1,000 or less or polyacrylates containing one or more cycloaliphatic rings.

3. A composition according to claim 1 wherein the first adhesion promoter b) further comprises one or more tertiary amine functional groups.

4. An article comprising glass or plastic having an abrasion resistant coating deposited thereon having a cured coating based on the composition of claim 1 disposed on a portion of one or more surfaces of the glass or coated plastic wherein the coating exhibits a light transmission of about 1 percent or less and an universal hardness of about 100 N/mm² or greater.

5. A composition according to claim 1 which further comprises f) one or more reactive diluents capable of reacting with the film forming resin.

6. A composition according to claim 5 which further comprises: g) thermoplastic wax.

7. A composition according to claim 5 wherein the functional groups capable of polymerization of the film-forming resin polymerize when exposed to irradiation and the composition further comprises: i) one or more catalysts or initiators capable of initiating polymerization of the film-forming resin.

8. A composition according to claim 5 which further comprises: h) one or more pigments or dyes.

9. A composition according to claim 8 wherein at least one of the one or more pigments are capable of blocking the transmission of ultraviolet light.

10. A composition according to claim 1 wherein the first adhesion promoter b) comprises one or more Michael Adducts.

11. A composition according to claim 10 wherein Michael Adduct is the reaction product of a polyacrylate and an amino alkoxysilane or siloxane.

12. A window structure comprising a window frame and a window which comprises either glass or abrasion resistant plastic, which has a cured coating according to claim 1 disposed on a surface of the glass or coated plastic.

13. A window structure according to claim 12 wherein the cured coating is bonded to an adhesive and the adhesive is further bonded to a window frame of the structure.

14. A kit comprising a composition according to claim 1 and an adhesive having functional moieties of isocyanate and or siloxanes.

15. A kit according to claim 14 wherein the adhesive further comprises one or more epoxy silanes, one or more melamine resins or a mixture thereof.

16. A composition comprising:
   a) one or more film forming resins having at least one functional group capable of polymerization;
   b) one or more adhesion promoters comprising compounds containing one or more unsaturated groups capable of free radical polymerization and one or more trialkoxy silane groups;
   c) one or more fillers capable of imparting abrasion resistance to the composition when polymerized;
   d) one or more compounds which is reactive with the film forming resin which also contains at least one acidic moiety;
   e) i) one or more compounds comprising a siloxane backbone and one or more active hydrogen groups capable of reacting with a functional group on a glass bonding adhesive; and, ii) A) one or more second adhesion promoters comprising one or more silicon, titanium, zirconium, aluminum, or metal containing compounds: ii) B) organic materials having reactive groups which contain one or more melamine units and unsaturated groups which polymerize when exposed to free radicals; or mixtures of ii) A) and ii) B);
   f) one or more reactive diluents capable of reacting with the film forming resin; and
   i) one or more catalysts or initiators capable of initiating polymerization of the film-forming resin;
   wherein the functional groups capable of polymerization of the film-forming resin polymerize when exposed to irradiation and the composition further comprises.

* * * * *